(12) United States Patent
Mosek

(10) Patent No.: US 7,970,957 B2
(45) Date of Patent: Jun. 28, 2011

(54) APPARATUS, METHOD AND COMPUTER READABLE MEDIUM FOR DISAMBIGUATING COMMANDS WITH RESPECT TO LOGICAL PROTOCOLS

(75) Inventor: Amir Mosek, Tel Aviv (IL)

(73) Assignee: SanDisk IL Ltd., Kfar Saba (IL)

( * ) Notice: Subject to any disclaimer, the term of this patent is extended or adjusted under 35 U.S.C. 154(b) by 116 days.

(21) Appl. No.: 11/960,770

(22) Filed: Dec. 20, 2007

(65) Prior Publication Data

US 2008/0155130 A1 Jun. 26, 2008

Related U.S. Application Data

(60) Provisional application No. 60/870,846, filed on Dec. 20, 2006.

(51) Int. Cl.
*G06F 3/00* (2006.01)
(52) U.S. Cl. ............... 710/11; 710/14; 710/15; 710/16
(58) Field of Classification Search .............. 710/1, 5–7, 710/8, 11, 14, 15, 16, 30
See application file for complete search history.

(56) References Cited

U.S. PATENT DOCUMENTS

| | | | |
|---|---|---|---|
| 6,339,586 B1 | 1/2002 | Motobayashi | |
| 7,401,086 B2 * | 7/2008 | Chorafakis et al. | 707/101 |
| 2002/0062407 A1 | 5/2002 | Tateyama et al. | |
| 2004/0078704 A1 | 4/2004 | Malueg et al. | |
| 2004/0164170 A1 | 8/2004 | Krygier et al. | |
| 2006/0026269 A1 | 2/2006 | Sadovsky et al. | |
| 2007/0094246 A1 * | 4/2007 | Dill et al. | 707/4 |
| 2007/0204089 A1 | 8/2007 | Proctor | |

FOREIGN PATENT DOCUMENTS

WO 2003003220 A2 1/2003

OTHER PUBLICATIONS

International Search Report and Written Opinion for International Application No. PCT/IL2007/001587, dated Jan. 28, 2009, 12 pages.

* cited by examiner

*Primary Examiner* — Alford W Kindred
*Assistant Examiner* — Richard Franklin
(74) *Attorney, Agent, or Firm* — Toler Law Group

(57) ABSTRACT

An apparatus, method and computer readable medium for disambiguating commands with respect to logical protocols is disclosed herein. In some embodiments, commands are disambiguated in accordance with an extent of device usage since a most recent device reset event. In some embodiments, commands are disambiguated in accordance with one or more command target parameters of a current command and/or one or more previous commands. In some embodiments, commands are disambiguated in accordance with a security policy and/or a data access policy and/or an indication of a data damage risk.

120 Claims, 23 Drawing Sheets

Command # 1 in protocol A : 00110100 01010100
Command # 2 in protocol A : 10110100 11001100
Command # 3 in protocol A : 01011000 01011010
Command # 4 in protocol A : 10111000 10001010

• • • • • • • • • • • •

Command # 67 in protocol A : 00111000 10011010
Command # 68 in protocol A : 01111000 11010010
Command # 69 in protocol A : 00110100 10010100
Command # 70 in protocol A : 10110100 01011100
Command # 71 in protocol A : 01010100 01001010

Single Logical Protocol

FIG. 1A

PRIOR ART

Two Logical Protocols with Ambiguous Commands

Identifier #1 >> Command # 1 in protocol A : 00110100 01010100
Identifier #1 >> Command # 2 in protocol A : 00110100 10010100 ⌐31
Identifier #2 >> Command # 1 in protocol B : 01011000 01011010
Identifier #1 >> Command # 3 in protocol A : 10111000 10001010

Identifier #1 >> Command # 67 in protocol A : 00111000 10011010
Identifier #1 >> Command # 68 in protocol A : 01111000 11010010
Identifier #2 >> Command # 33 in protocol B : 00110100 10010100 ⌐41
Identifier #2 >> Command # 34 in protocol B : 10110100 01011100
Identifier #2 >> Command # 35 in protocol B : 01010100 01001010

FIG. 1C  <u>Two Logical Protocols with Ambiguous Commands and Identifiers</u>  PRIOR ART Command # 0 in protocol A : "Start Protocol A"
Command # 1 in protocol A : 00110100 01010100
Command # 2 in protocol A : 10110100 11001100
Command # 3 in protocol A : 01011000 01011010
Command # 4 in protocol A : 10111000 10001010

Command # 37 in protocol A : "Start Protocol B"
Command # 1 in protocol B : 00111000 10011010
Command # 2 in protocol B : 01111000 11010010
Command # 3 in protocol B : 00110100 10010100
Command # 4 in protocol B : 10110100 01011100
Command # 5 in protocol B : 01010100 01001010

Command # 11 in protocol B : 01010100 01101010
Command # 12 in protocol B : "Start Protocol A"
Command # 1 in protocol A : 01011000 01011100
Command # 2 in protocol A : 11011000 11001100
Command # 3 in protocol A : 01101000 01101100
Command # 4 in protocol A : 10111000 10001010

Two Announced Alternating Logical Protocols

FIG. 1D  PRIOR ART

Command #1 in Protocol A
Command #2 in Protocol A
Command #3 in Protocol B
Command #4 in Protocol B
Command #5 in Protocol B
Command #6 in Protocol C
Command #7 in Protocol C

FIG. 3B

USE CASE II

SYNTAX SUPPORTS UP TO 512 SECTORS – DEVICE HAS 256 SECTORS

| Command Number | Interpretation In Protocol A | Command String | Interpretation In Protocol B |
|---|---|---|---|
| 53 | READSECTOR 84 * | 00110100 01010100 | CMD_X 20 |
| 54 | READSECTOR 20 * | 00110100 00010100 | CMD_Y 20 |
| 55 | READSECTOR 295 | 00110100 10010111 | * CMD_Z 23 |
| 56 | READSECTOR 21 | 00110100 00010101 | * CMD_Y 21 |

I) Transition Upon Handling Ambiguous Command 55 because "295" is Out of Range According to sector Range Policy;

II) When Handling Ambiguous Command 56 we "remain" in "Protocol A Mode" Because There is No "Violation" associated With CMD_Y 21

COMMAND 52 WAS INTERPRETED USING LOGICAL PROTOCOL A

⋯ Bias In Favor Of Most Recently Used Logical Protocol ⋯

FIG. 4A

USE CASE III

SYNTAX SUPPORTS UP TO 512 SECTORS – DEVICE HAS 256 SECTORS

| Command Number | Interpretation In Protocol A | Command String | Interpretation In Protocol B |
|---|---|---|---|
| 53 | READSECTOR 84 * | 00110100 01010100 | CMD_X 20 |
| 54 | READSECTOR 20 * | 00110100 00010100 | CMD_Y 20 |
| 55 | READSECTOR 295 | 00110100 10010111 | * CMD_Z 23 |
| 56 | READSECTOR 21 | 00110100 00010101 | * CMD_Y 21 |

I) Transition Upon Handling Ambiguous Command 55 because "295" is Out of Range According to sector Range Policy;

II) When Handling Ambiguous Command 56 we are "allowed" to transition back to protocol A Because because There is No "Violation" Associated With READSECTOR 21

Bias In Favor Of Protocol A

FIG. 4B

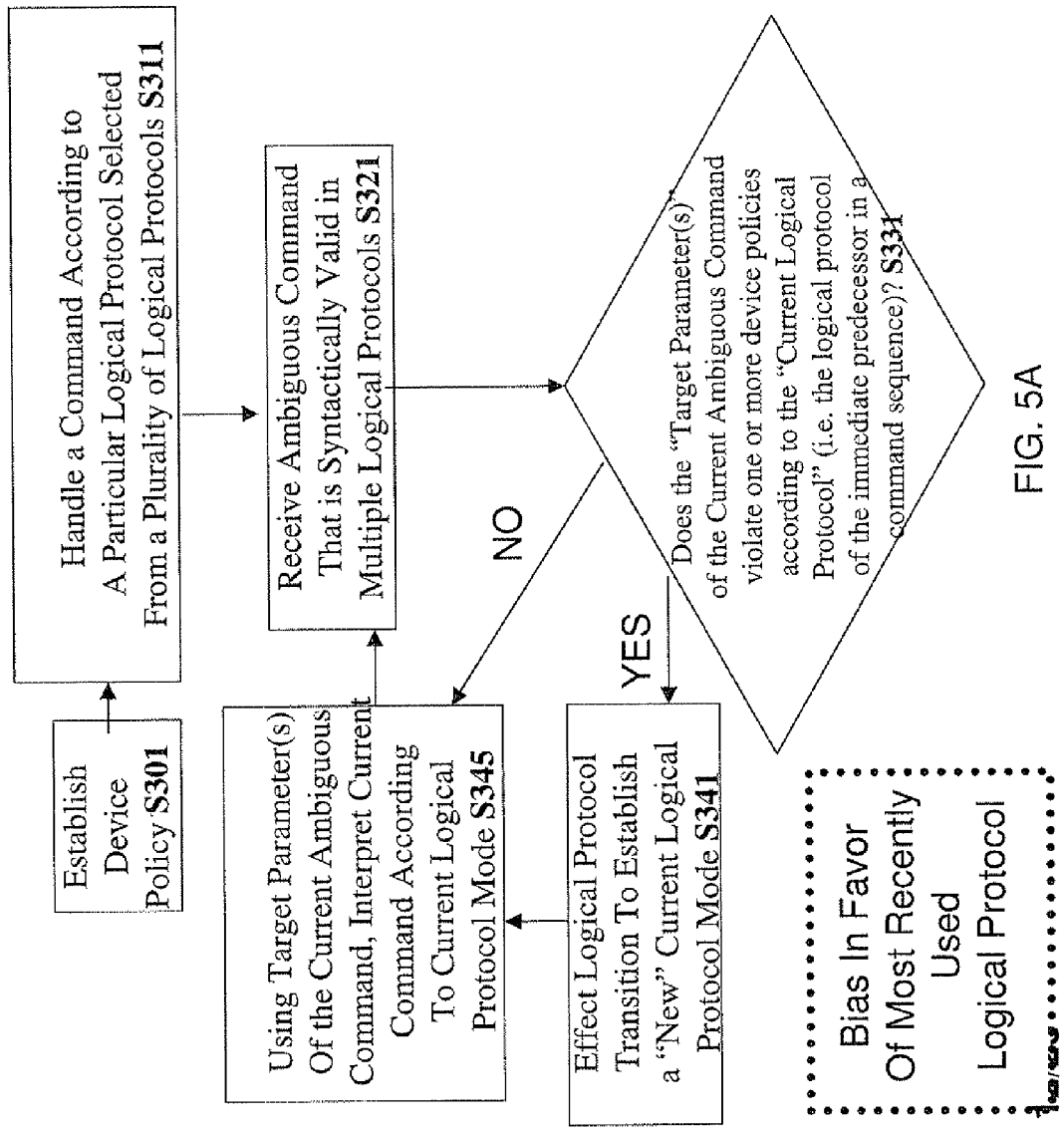

USE CASE IV
SYNTAX SUPPORTS UP TO 512 – DEVICE HAS 256 SECTORS

| Command Number | Interpretation In Protocol C | Command String | Interpretation in Protocol D |
|---|---|---|---|
| 91 | READSECTOR 199 * | 10110100 11000111 | CMD_U 7 |
| 92 | READFRWD 195 | 00110100 11000011 | * CMD_V 3 |
| 93 | READSECTOR 15 | 10110100 00001111 | * CMD_W 15 |
| 94 | READFRWD 195 | 00110100 11000011 | * CMD_V 3 |

COMMAND 90 WAS INTERPRETED USING LOGICAL PROTOCOL C

I) Transition Upon Handling Ambiguous Command 92 Because According to Protocol C Command Sequence {91,92} With Provided Parameters Violates Range Policy.

II) Even though command 93 does not violate any range policy (I.e. either by itself or together with previous commands), command 93 is interpreted according to Protocol D because CMD_W 15 does not violate any policy according to protocol D and there is a "bias" In favor of the "Current" logical protocol ........................
: Bias In Favor         :
: Of Most Recently      :
:       Used            :
:  Logical Protocol     :
........................

FIG. 6A

USE CASE V
SYNTAX SUPPORTS UP TO 512 – DEVICE HAS 256 SECTORS

| Command Number | Interpretation In Protocol C | Command String | Interpretation In Protocol D |
|---|---|---|---|
| 91 | READSECTOR 199 * | 10110100 11000111 | CMD_U 7 |
| 92 | READFRWD 195 | 00110100 11000011 | CMD_V 3 * |
| 93 | READSECTOR 15 * | 10110100 00001111 | CMD_W 15 |
| 94 | READFRWD 195 * | 00110100 11000011 | CMD_V 3 |

* Bias In Favor Of Protocol C

I) Transition Upon Handling Ambiguous Command 92 Because According to Protocol C Command Sequence {91,92} With Provided Parameters (199, 195) Violates Range Policy.

II) When Handling Ambiguous Command 93 we are "allowed" to transition back to protocol C Because Because There is No "Violation" Associated With READSECTOR 15

III) Commands 92 and 94 have the same parameters (each has "195" as a target Parameter); however, the parameters of command sequence {91,92} *collectively* violate a range policy while the parameter of command sequence {93,94} do not.

FIG. 6B

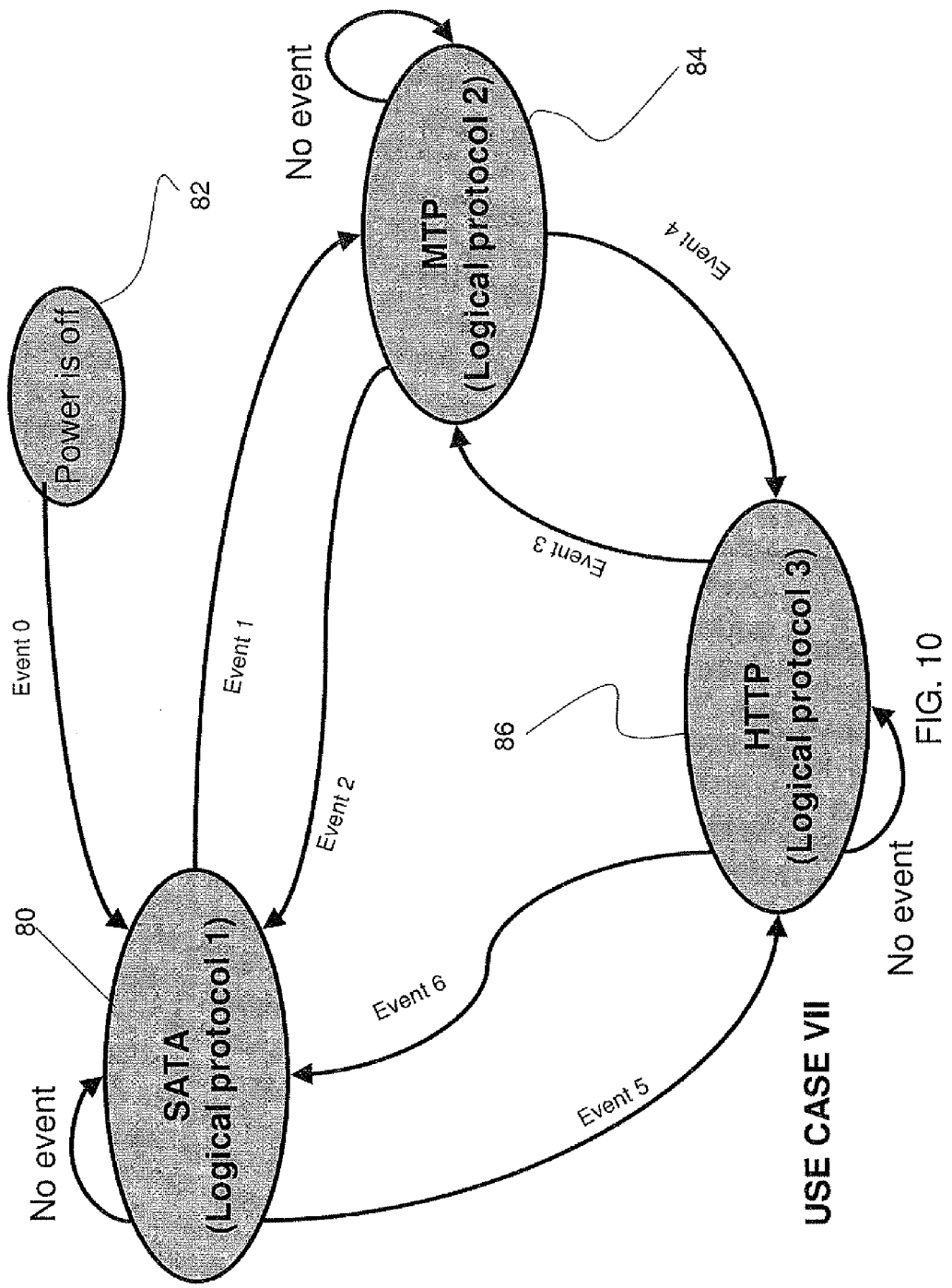

US 7,970,957 B2

APPARATUS, METHOD AND COMPUTER READABLE MEDIUM FOR DISAMBIGUATING COMMANDS WITH RESPECT TO LOGICAL PROTOCOLS

CROSS-REFERENCE TO RELATED APPLICATIONS

This patent application claims the benefit of U.S. Provisional Patent Application No. 60/870,846, filed Dec. 20, 2006 by the present inventor.

FIELD OF THE INVENTION

The present invention relates to systems for disambiguating commands with respect to logical protocols.

BACKGROUND AND RELATED ART

Digital communication protocols are well known in the art of computer engineering as a means for enabling the standardized exchange of data between different devices or components.

It is known that different commands may be sent from a source device to a destination device in a given logical protocol. FIG. 1A shows the flow of commands sent by a source device (for example, a personal computer or a mobile phone) to a destination device (for example, a USB flash drive or an SD card) using logical protocol A. Command #1 (00110100 01010100) is sent from the source device to the destination device. The command is interpreted by the destination device and is executed. When the command execution is completed, a second command is sent by the source device (10110100 11001100) and it is followed by command #3 (01011000 01011010), command #4 (10111000 10001010), and so on, through to the last command #71 (01010100 01001010).

Different protocols may require different physical connections (e.g. having a different number of wires or different timing of signals). Therefore it is common to distinguish between physical interfaces and logical protocols. Different logical protocols may also share the same physical interface or physical protocol, but differ in the meaning of the logical data that is communicated.

For example, the MultiMediaCard™ (MMC) physical protocol accommodates the Serial Advanced Technology Attachment (SATA), Consumer Electronics ATA (CE-ATA), and Secure Digital Input Output (SDIO) logical protocols.

When one or more logical protocols are used on a particular physical inter-device interface, both parties (i.e. each of the at least two devices sending and/or receiving information via the inter-device physical interface) need to "know" or determine which logical protocol is being used for communication.

In some cases, both sides "understand" only one logical protocol (i.e. are configured to issue and/or interpret commands according to only one logical protocol). In this "simple" case, the two or more devices may communicate with each other using the "single allowable logical protocol" whenever connected to each other via the correct physical interface. One typical example related is the case of the USB protocol, where both the physical interface and the logical protocol are uniquely defined. Thus, in the example, the physical USB interface "supports" a single logical protocol, namely the USB protocol.

However, in other cases in computer engineering, it is necessary, during operation, for a device to handle commands of different logical protocols received via a particular physical interface. Towards this end, the "command receiving" device must determine in which protocol to interpret any received commands (i.e. the command receiving device must select the "most correct" protocol from a plurality of possible logical protocols). Sometimes, after receiving a sequence of commands that are in a "first" logical protocol, the "command receiving" device (e.g. a peripheral device which receives commands from a host device) must "effect a protocol mode switch" and interpret the next command in a "second" and different logical protocol.

One example of a device capable of handling commands in different logical protocols received via the same physical inter-device interface is a USB Flash Disk (UFD), such as the XA-HD500® mass storage device available from JVC America Corporation or the Sansa® media player sold by Sandisk Corporation, Milpitas, Calif. Each of these devices supports both Media Transfer Protocol (MTP) and Mass Storage Class protocols when connected to a personal computer via a USB "physical inter-device interface."

In many examples, the switching between the protocols is frequent, and the commands of both protocols are practically interleaved. This does not pose a problem as long as (i) the two logical protocols do not share any common or "ambiguous" commands and each command on the channel is valid in no more than one of the two or more logical protocols (it can also be not valid in any of the protocols), or, alternatively, (ii) if each data packet is associated with an identifier of the sender or the receiver—information that is sufficient to identify the protocol.

Unfortunately, such "sterile" separation between logical protocols is not always possible, and two protocols employed on the same physical interface may find themselves sharing the same valid commands.

One example of a use case where an ambiguous command is received from a host device by a peripheral device is shown in FIG. 1B.

FIG. 1B shows the flow of commands sent by a source device to a destination device using two different logical protocols, A and B, over the same physical interface. As shown, command #2 (reference number 11) of protocol A is identical to command #33 (reference number 21) of protocol B. Thus, commands 11 and 21 are examples of "ambiguous" commands which are syntactically valid both in protocol A and in protocol B.

In FIG. 1B, the first command in protocol A is sent with the value 00110100 01010100. Then the second command (reference number 11) in protocol A is sent by the source device with the value 00110100 10010100. When the second command in protocol A has been executed by the destination device, the source device side switches to protocol B and sends the first command in protocol B, 01011000 01011010. The source device then switches back to protocol A and sends the fourth command in protocol A, 10111000 10001010. This switching may continue, as indicated by the ellipsis in the figure. After the source device sends command #68 in protocol A, the source device again switches from protocol A to protocol B and sends command #33 (reference number 21) in protocol B. Command #33 (with value of 00110100 10010100) is syntactically valid in both protocol B and protocol A; it has the same value as command 2 (reference number 11) in protocol A but with a different meaning.

Command Identifiers

FIG. 1C describes a use case where a so-called "logical protocol identifier" is associated with each command. As in FIG. 1B, FIG. 1C shows the flow of commands sent by a source device to a destination device using logical protocol A and logical protocol B over the same physical interface. However, in FIG. 1C the syntax of both logical protocols A and B includes an identifier. The identifier is a part of the command and indicates (directly or indirectly) the identity of the protocol for the current command. For example, an identifier can be:

The Ethernet port number, from which the logical protocol (as well as the client application and the server application) can be derived.

The Process ID. Based on a source device process ID, the destination device identifies the relevant protocol.

In one example, two processes reside on the host device, including a first process (i.e. process X) that sends commands in protocol A, and a second process (i.e. process Y) that sends commands in protocol B. According to this example, a so-called "bus-driver" residing on the host side must ensure that every command from one process (e.g. process X which sends commands in protocol A) is sent completely before a command from the other process (i.e. process Y which sends commands in protocol B) is allowed into the bus, in order to link all command words of the command to the identifier of the command.

Announcement Command

FIG. 1D describes a use case where a so-called "announcement command" is included in the ordered sequence of commands.

As in FIG. 1B, FIG. 1D shows the flow of commands sent by a source device to a destination device using logical protocol A and logical protocol B over the same physical interface. However, in FIG. 1D the syntax of both logical protocols supports an announcement command, which tells the destination device which protocol applies to the subsequent commands. An announcement command can be, for example, one of the following:

1) A source device sends a command in protocol A, to be interpreted as: "Switch now to protocol B and stay in protocol B until further notice". The "further notice" arrives in protocol B and says: "Switch now to protocol A and stay in protocol A until further notice".

2) A source device sends a command in protocol A, to be interpreted as: "Switch now to protocol B for 17 commands, and then return automatically back to protocol A". This mode eliminates both the need for a "return" command and the need to modify the syntax of protocol B.

According to the second type of announcement (i.e. which includes a specific number of commands) the "receiving device" will, upon receiving this announcement commit or set itself to interpreting the next 17 commands (i.e. or whatever other number is specified) in protocol B. The number of commands flagged or assigned to be subsequently executed in protocol B will be 17, in accordance with the "17" of the announcement command.

It is noted that the "announcement command" (51 or 61 or 71) is a "dedicated command" whose only purpose is to indicate a protocol transition.

FIG. 1D illustrates the first type of such an announcement. The first command 51 is an announcement command in protocol A, which informs the destination device that the subsequent commands are in protocol A. The source sends commands in protocol A. The last command in protocol A is command #36 (not shown). The source device then sends one more command in protocol A, command #37 (reference number 61), which is an announcement command in protocol A saying "switch to protocol B". The destination and the source device switch to protocol B accordingly. The next commands sent by the source to the destination device are in protocol B. Specifically, in FIG. 1D, the next command in the sequence is the first command that is sent in protocol B (value: 00111000

10011010), and protocol B prevails until the source device sends command #12 (still in protocol B, reference 71), which is an announcement command that says: "switch to protocol A". Then both the destination device and the source device switch to protocol A. The next commands sent by the source device to the destination device are in protocol A.

As with the previous case (i.e. command identifiers), a so-called "bus driver" residing on the host ensures that once one protocol is announced (e.g. by a "first process" on the host which sends commands exclusively in protocol A), only command words of that protocol are sent until the other protocol (e.g. used by a "second process" in a different process space on the host) is announced.

SUMMARY

The present inventor is now disclosing methods, apparatuses, and computer readable media having computer program code stored thereon for performing disambiguation of commands received via an inter-device physical interface that "supports" more than one logical protocol.

It is now disclosed for the first time a method of performing command disambiguation for a system including a first device and a second device where the first device sends commands to be received by the second device, the method comprising: a) receiving, by the second device from the first device, a plurality of commands including an ambiguous command that is syntactically valid in a plurality of different logical protocols; and b) contingent on an extent of device usage since a most recent device reset event, effecting a logical protocol transition to associate the ambiguous command with a logical protocol that is different from a logical protocol used to interpret an immediate predecessor command received by the second device after the most recent device reset event.

According to some embodiments, the ambiguous command is received via a point-to-point physical connection connecting the first device to the second device.

According to some embodiments, the method further comprises: c) interpreting, by the second device, the received ambiguous command using the associated logical protocol.

According to some embodiments, the device-usage-extent-contingent effecting of the logical protocol transition is contingent on the device usage extent exceeding a pre-determined threshold.

According to some embodiments, the device-usage-extent-contingent effecting of the logical protocol transition is contingent on at least one of: i) a usage extent of the first device, which sends the commands; and ii) a usage extent of the second device, which receives the commands from the first device.

According to some embodiments, the device-usage-extent-contingent effecting of the logical protocol transition is contingent on at least one of: i) a number of commands previously received by the second device from the first device since the most recent device reset event; ii) a number of commands previously executed by the second device since the most recent device reset event; iii) a time elapsed since the most recent device reset event; and iv) a total amount of data received from the first device by the second device since the most recent device reset event.

According to some embodiments, the most recent device reset event is one of: i) a most recent device powering-up (i.e. of the host or of the peripheral); and ii) a most recent device resume-from-suspend.

According to some embodiments, the most recent device reset event is selected from the group consisting of: i) a most recent reset event of the first device, which sends the commands; and ii) a most recent reset event of the second device, which receives the commands.

According to some embodiments, the logical protocol transition is a transition away from a device boot or wake-up protocol (i.e. the first protocol used by "second" or "receiving" or "peripheral" the device upon host device boot or wake up).

Exemplary protocols include but are not limited to object oriented storage protocols, block device protocols (for example, logical block address ("LBA") protocols), IP based protocols, Simple Object Access Protocols (SOAP), XML protocols, HTTP protocols, FTP protocols, Internet protocols and device boot protocols.

According to some embodiments, the plurality of protocols includes at least two of: i) an object oriented storage protocol; ii) a block device protocol; iii) an IP based protocol; iv) a SOAP protocol; v) an XML protocol; vi) an HTTP protocol; vii) an FTP protocol; viii) an Internet protocol; and ix) a device boot protocol.

It is now disclosed for the first time a method of performing command disambiguation for a system including a first device and a second device where the first device sends commands to be received by the second device, the method comprising: a) receiving, by the second device from the first device, a plurality of commands including an ambiguous command that is syntactically valid in a plurality of different logical protocols; and b) in accordance with an extent of device usage since a most recent device reset event, selecting: i) for the ambiguous command, and ii) from the plurality of logical protocols, a logical protocol as a target protocol in which to interpret the ambiguous command, wherein the selected target logical protocol is different from an initial protocol used to interpret a first command received after the most recent device reset event.

According to some embodiments, the ambiguous command is received via a point-to-point physical connection connecting the first device to the second device.

According to some embodiments, the plurality of protocols includes at least two of: i) an object oriented storage protocol; ii) a block device protocol; iii) an IP based protocol; iv) a SOAP protocol; v) an XML protocol; vi) an HTTP protocol; vii) an FTP protocol; viii) an Internet protocol; and ix) a device boot protocol.

According to some embodiments, the method further comprises: c) interpreting, by the second device, the received ambiguous command using the selected target logical protocol.

According to some embodiments, the device-usage-extent-contingent effecting of the logical protocol transition is contingent on the device usage extent exceeding a pre-determined threshold.

According to some embodiments, the device-usage-extent-contingent effecting of the logical protocol transition is contingent on at least one of: i) a usage extent of the first device, which sends the commands; and ii) a usage extent of the second device, which receives the commands from the first device.

According to some embodiments, the device-usage-extent-contingent effecting of the logical protocol transition is contingent on at least one of: i) a number of commands previously received by the second device from the first device since the most recent device reset event; ii) a number of commands previously executed by the second device since the most recent device reset event; iii) a time elapsed since the most recent device reset event; and iv) a total amount of data received from the first device by the second device since the most recent device reset event.

According to some embodiments, the most recent device reset event is one of: i) a most recent device powering-up (i.e. of the host or of the peripheral); and ii) a most recent device resume-from-suspend.

According to some embodiments, the most recent device reset event is selected from the group consisting of: i) a most recent reset event of the first device, which sends the commands; and ii) a most recent reset event of the second device, which receives the commands.

It is now disclosed for the first time a peripheral device comprising: a) an inter-device interface for coupling with a host device; and b) a logical protocol selector operative to: i) receive, from the host device via the inter-device interface, a plurality of commands including an ambiguous command that is syntactically valid in a plurality of different logical protocols; and ii) contingent on an extent of device usage since a most recent device reset event, effect a logical protocol transition to associate the ambiguous command with a logical protocol that is different from a logical protocol used to interpret an immediate predecessor command received via the inter-device interface after the device reset event.

According to some embodiments, the peripheral device further comprises: c) a command interpreter operative to interpret the received ambiguous command using the associated logical protocol.

According to some embodiments, the logical protocol selector is operative such that the device-usage-extent-contingent effecting of the logical protocol transition is contingent on the device usage extent exceeding a pre-determined threshold.

According to some embodiments, the logical protocol selector is operative such that the device-usage-extent-contingent effecting of the logical protocol transition is contingent on at least one of: i) a usage extent of the host device, which sends the commands; and ii) a usage extent of the peripheral device, which receives the commands from the host device.

According to some embodiments, the logical protocol selector is operative such that the device-usage-extent-contingent effecting of the logical protocol transition is contingent on at least one of: i) a number of commands previously received by the peripheral device from the first device since the most recent device reset event; ii) a number of commands previously executed by the peripheral device since the most recent device reset event; iii) a time elapsed since the most recent device reset event; and iv) a total amount of data received from the host device by the peripheral device since the most recent device reset event.

According to some embodiments, the logical protocol selector is operative such that the most recent device reset event is one of: i) a most recent device powering-up (i.e. of the host or of the peripheral); and ii) a most recent device resume-from-suspend.

According to some embodiments, the logical protocol selector is operative such that the most recent device reset event is selected from the group consisting of: i) a most recent reset event of the host device, which sends the commands; and ii) a most recent reset event of the peripheral device, which receives the commands.

According to some embodiments, the logical protocol selector is operative such that the logical protocol transition is a transition away from a device boot or wake-up protocol (i.e. the first protocol used by "second" or "receiving" or "peripheral" the device upon host device boot or wake up).

It is now disclosed for the first time a peripheral device comprising: a) an inter-device interface for coupling with a host device; and b) a logical protocol selector operative to: i) receive, from the host device via the inter-device interface, a plurality of commands including an ambiguous command that is syntactically valid in a plurality of different logical protocols; and ii) in accordance with an extent of device usage since a most recent device reset event, select: A) for the ambiguous command, and B) from the plurality of logical protocols, a logical protocol as a target protocol in which to interpret the ambiguous command, wherein the selected target logical protocol is different from an initial protocol used to interpret a first command received via the inter-device interface after the most recent device reset event.

According to some embodiments, the peripheral device further comprises: c) a command interpreter operative to interpret the received ambiguous command using the selected target logical protocol.

According to some embodiments, the logical protocol selector is operative such that the device-usage-extent-contingent selecting of the target protocol is contingent on the device usage extent exceeding a pre-determined threshold.

According to some embodiments, the logical protocol selector is operative such that the device-usage-extent-contingent selecting of the target protocol is contingent on at least one of: i) a usage extent of the host device, which sends the commands; and ii) a usage extent of the peripheral device, which receives the commands from the first device.

According to some embodiments, the logical protocol selector is operative such that the device-usage-extent-contingent selecting of the target protocol is contingent on at least one of: i) a number of commands previously received by the peripheral device from the host device since the most recent device reset event; ii) a number of commands previously executed by the peripheral device since the most recent device reset event; iii) a time elapsed since the most recent device reset event; and iv) a total amount of data received from the host device by the peripheral device since the most recent device reset event.

According to some embodiments, the logical protocol selector is operative such that the most recent device reset event is one of: i) a most recent device powering-up (i.e. of the host or of the peripheral); and ii) a most recent device resume-from-suspend.

According to some embodiments, the logical protocol selector is operative such that the most recent device reset event is selected from the group consisting of: i) a most recent reset event of the host device, which sends the commands; and ii) a most recent reset event of the peripheral device, which receives the commands.

It is now disclosed for the first time a method of performing command disambiguation for a system including a first device and a second device where the first device sends commands to be received by the second device, the method comprising: a) receiving, by the second device from the first device, a plurality of commands including an ambiguous command that is syntactically valid in a plurality of different logical protocols; b) determining whether or not to effect a logical protocol transition in accordance with at least one target parameter of the ambiguous command; c) if the determination is a positive determination, interpreting the ambiguous command, using at least one target parameter of the ambiguous command, in a target logical protocol that is different from a logical protocol used to interpret an immediate predecessor of the ambiguous command; and d) otherwise, interpreting the ambiguous command in the logical protocol used to interpret the immediate predecessor.

According to some embodiments, the ambiguous command is received via a point-to-point physical connection connecting the first device to the second device.

According to some embodiments, the logical protocol transition is a transition away from a device boot or wake-up protocol (i.e. the first protocol used by "second" or "receiving" or "peripheral" the device upon host device boot or wake up).

According to some embodiments, the ambiguous command is received via a point-to-point physical connection connecting the first device to the second device.

According to some embodiments, the determining is carried out in accordance with a data access policy.

According to some embodiments, the determining is carried out in accordance with a security policy.

According to some embodiments, at least one target parameter is selected from the group consisting of: i) a sector identifier; ii) a partition identifier; iii) a block identifier; iv) a file identifier; v) a directory identifier; and vi) data object identifier.

According to some embodiments, the plurality of protocols includes at least two of: i) an object oriented storage protocol; ii) a block device protocol; iii) an IP based protocol; iv) a SOAP protocol; v) an XML protocol; vi) an HTTP protocol; vii) an FTP protocol; viii) an Internet protocol; and ix) a device boot protocol.

It is now disclosed for the first time a peripheral device comprising: a) an inter-device interface for coupling with a host device; b) a logical protocol selector operative to: i) receive, from the host device via the inter-device interface, a plurality of commands including an ambiguous command that is syntactically valid in a plurality of different logical protocols; and ii) determine whether or not to effect a logical protocol transition in accordance with at least one target parameter of the ambiguous command; and c) a command interpreter operative: i) if the determination is a positive determination, to interpret the ambiguous command, using at least one target parameter of the ambiguous command, in a target logical protocol that is different from a logical protocol used to interpret an immediate predecessor of the ambiguous command; and ii) otherwise to, interpret the ambiguous command in the logical protocol used to interpret the immediate predecessor.

According to some embodiments, the logical protocol selector is operative such that the determining is carried out in accordance with a data access policy.

According to some embodiments, the logical protocol selector is operative such that the determining is carried out in accordance with a security policy.

According to some embodiments, the logical protocol selector is operative such that the logical protocol transition is a transition away from a device boot or wake-up protocol (i.e. the first protocol used by "second" or "receiving" or "peripheral" the device upon host device boot or wake up).

It is now disclosed for the first time a method of performing command disambiguation for a system including a first device and a second device where the first device sends commands to be received by the second device, the method comprising: a) receiving, by the second device from the first device, an ordered sequence of commands including an ambiguous command that is syntactically valid in a plurality of different logical protocols; b) contingent on one or more target parameters of the ambiguous command, effecting a logical protocol transition to associate the ambiguous command with a target logical protocol that is different from a logical protocol used to interpret an immediate predecessor of the ambiguous command; and c) interpreting N consecutive commands using the associated target logical protocol, wherein: i) a first command of the N consecutive commands is the ambiguous command; and ii) N is a positive integer whose value does not depend on the one or more target parameters of the ambiguous command.

According to some embodiments, the ambiguous command is received via a point-to-point physical connection connecting the first device to the second device.

According to some embodiments, the logical protocol transition is a transition away from a device boot or wake-up protocol (i.e. the first protocol used by "second" or "receiving" or "peripheral" the device upon host device boot or wake up).

According to some embodiments, the peripheral device method comprises: c) interpreting, by the second device, the received ambiguous command using the associated logical protocol.

According to some embodiments, the plurality of protocols includes at least two of: i) an object oriented storage protocol; ii) a block device protocol; iii) an IP based protocol; iv) a SOAP protocol; v) an XML protocol; vi) an HTTP protocol; vii) an FTP protocol; viii) an Internet protocol; and ix) a device boot protocol.

According to some embodiments, the effecting of the logical protocol transition is carried out in accordance with a data access policy.

According to some embodiments, the effecting of the logical protocol transition is carried out in accordance with a security policy.

According to some embodiments, at least one target parameter is selected from the group consisting of: i) a sector identifier; ii) a partition identifier; iii) a block identifier; iv) a file identifier; v) a directory identifier; and vi) data object identifier.

It is now disclosed for the first time a peripheral device comprising: a) an inter-device interface for coupling with a host device; b) a logical protocol selector operative to: i) receive, from the host device via the inter-device interface, a plurality of commands including an ambiguous command that is syntactically valid in a plurality of different logical protocols; and ii) contingent on one or more target parameters of the ambiguous command, to effect a logical protocol transition to associate the ambiguous command with a target logical protocol that is different from a logical protocol used to interpret an immediate predecessor of the ambiguous command; and c) a command interpreter operative to interpret N consecutive commands using the associated target logical protocol, wherein: i) a first command of the N consecutive commands is the ambiguous command; and ii) N is a positive integer whose value does not depend on the one or more target parameters of the ambiguous command.

According to some embodiments, the logical protocol selector is operative such that the logical protocol transition is a transition away from a device boot or wake-up protocol (i.e. the first protocol used by "second" or "receiving" or "peripheral" the device upon host device boot or wake up).

According to some embodiments, the logical protocol selector is operative such that the effecting of the logical protocol transition is carried out in accordance with a data access policy.

According to some embodiments, the logical protocol selector is operative such that the effecting of the logical protocol transition is carried out in accordance with a security policy.

According to some embodiments, the logical protocol selector is to effect the logical protocol transition in accordance with at least one target parameter selected from the group consisting of: i) a sector identifier; ii) a partition identifier; iii) a block identifier; iv) a file identifier; v) a directory identifier; and vi) data object identifier.

It is now disclosed for the first time a method of performing command disambiguation for a system including a first device and a second device where the first device sends commands to be received by the second device, the method comprising: a) receiving, by the second device from the first device, an ordered sequence of commands including an ambiguous command that is syntactically valid in a plurality of different logical protocols; and b) contingent on one or more target parameters of the ambiguous command, effecting a logical protocol transition to associate the ambiguous command with a target logical protocol that is different from a predecessor logical protocol used to interpret an immediate predecessor of the ambiguous command; c) interpreting N consecutive commands using the associated target logical protocol, wherein: i) N is a positive integer; ii) a first command of the N consecutive commands is the ambiguous command; and iii) no commitment is made to interpret a subsequent command, which is received after the N consecutive commands, using the predecessor logical protocol.

According to some embodiments, the ambiguous command is received via a point-to-point physical connection connecting the first device to the second device.

According to some embodiments, the method further comprises: c) interpreting, by the second device, the received ambiguous command using the associated logical protocol.

According to some embodiments, the logical protocol transition is a transition away from a device boot or wake-up protocol (i.e. the first protocol used by "second" or "receiving" or "peripheral" the device upon host device boot or wake up).

According to some embodiments, the target-parameter-contingent logical protocol transition is carried out in accordance with a data access policy.

According to some embodiments, the target-parameter-contingent logical protocol transition is carried out in accordance with a security policy.

According to some embodiments, at least one target parameter is selected from the group consisting of: i) a sector identifier; ii) a partition identifier; iii) a block identifier; iv) a file identifier; v) a directory identifier; and vi) data object identifier.

According to some embodiments, the plurality of protocols includes at least two of: i) an object oriented storage protocol; ii) a block device protocol; iii) an IP based protocol; iv) a SOAP protocol; v) an XML protocol; vi) an HTTP protocol; vii) an FTP protocol; viii) an Internet protocol; and ix) a device boot protocol.

It is now disclosed for the first time a peripheral device comprising: a) an inter-device interface for coupling with a host device; b) a logical protocol selector operative: i) to receive, from the host device via the inter-device interface, a plurality of commands including an ambiguous command that is syntactically valid in a plurality of different logical protocols; and ii) contingent on one or more target parameters of the ambiguous command, to effect a logical protocol transition to associate the ambiguous command with a target logical protocol that is different from a logical protocol used to interpret an immediate predecessor of the ambiguous command; and c) a command interpreter operative to interpret N consecutive commands using the associated target logical protocol, wherein: i) N is a positive integer; ii) a first command of the N consecutive commands is the ambiguous command; and iii) no commitment is made to interpret a subsequent command, which is received after the N consecutive commands, using the predecessor logical protocol.

According to some embodiments, the logical protocol selector is operative such that the logical protocol transition is a transition away from a device boot or wake-up protocol (i.e. the first protocol used by "second" or "receiving" or "peripheral" the device upon host device boot or wake up).

According to some embodiments, the logical protocol selector is operative such that the logical protocol transition is a transition away from a device boot or wake-up protocol (i.e. the first protocol used by "second" or "receiving" or "peripheral" the device upon host device boot or wake up).

According to some embodiments, the logical protocol selector is operative such that the effecting of the logical protocol transition is carried out in accordance with a data access policy.

According to some embodiments, the logical protocol selector is operative such that the effecting of the logical protocol transition is carried out in accordance with a security policy.

According to some embodiments, the logical protocol selector is to effect the logical protocol transition in accordance with at least one target parameter selected from the group consisting of: i) a sector identifier; ii) a partition identifier; iii) a block identifier; iv) a file identifier; v) a directory identifier; and vi) data object identifier.

It is now disclosed for the first time a method of performing command disambiguation for a system including a first device and a second device where the first device sends commands to be received by the second device, the method comprising: a) receiving, by the second device from the first device, a plurality of commands including an ambiguous command that is syntactically valid in a plurality of different logical protocols; and b) in accordance with a combination of: i) one or more target parameters of one or more commands received before the ambiguous command; and ii) one or more target parameters of the ambiguous command, selecting for the ambiguous command a logical protocol from the plurality of logical protocols as a target protocol in which to interpret the ambiguous command.

According to some embodiments, the ambiguous command is received via a point-to-point physical connection connecting the first device to the second device.

According to some embodiments, the method further comprises: c) interpreting, by the second device, the received ambiguous command using the selected target logical protocol.

According to some embodiments, the plurality of protocols includes at least two of: i) an object oriented storage protocol; ii) a block device protocol; iii) an IP based protocol; iv) a SOAP protocol; v) an XML protocol; vi) an HTTP protocol; vii) an FTP protocol; viii) an Internet protocol; and ix) a device boot protocol.

According to some embodiments, the target-parameter-dependent selecting of the target logical protocol is carried out in accordance with a data access policy.

According to some embodiments, the target-parameter-dependent selecting of the target logical protocol is carried out in accordance with a security policy.

According to some embodiments, at least one target parameter is selected from the group consisting of: i) a sector identifier; ii) a partition identifier; iii) a block identifier; iv) a file identifier; v) a directory identifier; and vi) data object identifier.

It is now disclosed for the first time a peripheral device comprising: a) an inter-device interface for coupling with a host device; and b) a logical protocol selector operative to: i) receive, from the host device via the inter-device interface, a plurality of commands including an ambiguous command that is syntactically valid in a plurality of different logical protocols; ii) in accordance with a combination of: A) one or more target parameters of one or more commands received before the ambiguous command; and B) one or more target parameters of the ambiguous command, select for the ambiguous command a logical protocol from the plurality of logical protocols as a target protocol in which to interpret the ambiguous command.

According to some embodiments, the peripheral device further comprises: c) a command interpreter operative to interpret the received ambiguous command using the selected target logical protocol.

According to some embodiments, the logical protocol selector is operative such that the selecting of the target logical protocol is carried out in accordance with a data access policy.

According to some embodiments, the logical protocol selector is operative such that the selecting of the target logical protocol is carried out in accordance with a security policy.

According to some embodiments, the logical protocol selector is operative to effect the target logical protocol selecting in accordance with at least one target parameter selected from the group consisting of: i) a sector identifier; ii) a partition identifier; iii) a block identifier; iv) a file identifier; v) a directory identifier; and vi) data object identifier.

According to some embodiments, the logical protocol selector is operative such that the target-parameter-dependent selecting of the target logical protocol is carried out in accordance with a data access policy.

According to some embodiments, the logical protocol selector is operative such that the target-parameter-dependent selecting of the target logical protocol is carried out in accordance with a security policy.

According to some embodiments, the logical protocol selector is operative such that at least one target parameter is selected from the group consisting of: i) a sector identifier; ii) a partition identifier; iii) a block identifier; iv) a file identifier; v) a directory identifier; and vi) data object identifier.

It is now disclosed for the first time a method of performing command disambiguation for a system including a first device and a second device where the first device sends commands to be received by the second device, the method comprising: a) receiving, by the second device from the first device, a plurality of commands including an ambiguous command that is syntactically valid in a plurality of different logical protocols; and b) in response to an accessing of at least one of: i) a pre-defined location in non-volatile memory of the second device which receives the commands; and ii) a pre-defined object stored in the non-volatile memory of the second device which receives the commands, selecting for the ambiguous command a logical protocol from the plurality of logical protocols as a target protocol in which to interpret the ambiguous command.

According to some embodiments, the ambiguous command is received via a point-to-point physical connection connecting the first device to the second device.

According to some embodiments, the accessing is a read-accessing.

According to some embodiments, the pre-defined location is a location of a last sector of an operating system (OS) image.

According to some embodiments, the pre-defined object is an OS image.

According to some embodiments, the plurality of protocols includes at least two of: i) an object oriented storage protocol; ii) a block device protocol; iii) an IP based protocol; iv) a SOAP protocol; v) an XML protocol; vi) an HTTP protocol; vii) an FTP protocol; viii) an Internet protocol; and ix) a device boot protocol.

It is now disclosed for the first time a peripheral device comprising: a) an inter-device interface for coupling with a host device; b) a logical protocol selector operative to: i) receive, from the host device via the inter-device interface, a plurality of commands including an ambiguous command that is syntactically valid in a plurality of different logical protocols; ii) in response to an accessing of at least one of: A) a pre-defined location in non-volatile memory of the second device which receives the commands; and B) a pre-defined object stored in the non-volatile memory of the second device which receives the commands, select for the ambiguous command a logical protocol from the plurality of logical protocols as a target protocol in which to interpret the ambiguous command.

According to some embodiments, the logical protocol selector is operative such that the accessing is a read-accessing.

According to some embodiments, the logical protocol selector is operative such that the pre-defined location is a location of a last sector of an operating system (OS) image.

According to some embodiments, the logical protocol selector is operative such that the pre-defined object is an OS image.

According to some embodiments, the peripheral device further comprises: c) a command interpreter operative to interpret the received ambiguous command using the selected target logical protocol.

It is now disclosed for the first time a method of performing command disambiguation for a system including a first device and a second device where the first device sends commands to be received by the second device, the method comprising: a) receiving, by the second device from the first device, a plurality of commands including an ambiguous command that is syntactically valid in a plurality of different logical protocols; and b) in accordance with a logical-protocol-dependent indication that the ambiguous command violates at least one device policy selected from the group consisting of: i) a security policy; and ii) a data access policy, selecting for the ambiguous command a logical protocol from the plurality of logical protocols as a target protocol in which to interpret the ambiguous command.

According to some embodiments, the ambiguous command is received via a point-to-point physical connection connecting the first device to the second device.

According to some embodiments, the method further comprises: c) interpreting, by the second device, the received ambiguous command using the selected target logical protocol.

According to some embodiments, the plurality of protocols includes at least two of: i) an object oriented storage protocol; ii) a block device protocol; iii) an IP based protocol; iv) a SOAP protocol; v) an XML protocol; vi) an HTTP protocol; vii) an FTP protocol; viii) an Internet protocol; and ix) a device boot protocol.

It is now disclosed for the first time a peripheral device comprising: a) an inter-device interface for coupling with a host device; b) a logical protocol selector operative to: i) receive, from the host device via the inter-device interface, a plurality of commands including an ambiguous command that is syntactically valid in a plurality of different logical protocols; and ii) in accordance with a logical-protocol-dependent indication that the ambiguous command violates at least one device policy selected from the group consisting of: A) a security policy; and B) a data access policy, select for the ambiguous command a logical protocol from the plurality of logical protocols as a target protocol in which to interpret the ambiguous command.

According to some embodiments, the peripheral device further comprises: c) a command interpreter operative to interpret the received ambiguous command using the selected target logical protocol.

It is now disclosed for the first time a method of performing command disambiguation for a system including a first device and a second device where the first device sends commands to be received by the second device, a) receiving, by the second device from the first device, a plurality of commands including an ambiguous command that is syntactically valid in a plurality of different logical protocols; and b) in accordance with an indication of a data damage risk associated with executing of the ambiguous command in a candidate protocol selected from the plurality of logical protocols, selecting for the ambiguous command a logical protocol from the plurality of logical protocols as a target protocol in which to interpret the ambiguous command.

According to some embodiments, the ambiguous command is received via a point-to-point physical connection connecting the first device to the second device.

According to some embodiments, the method further comprises: c) interpreting, by the second device, the received ambiguous command using the selected target logical protocol.

According to some embodiments, the plurality of protocols includes at least two of: i) an object oriented storage protocol; ii) a block device protocol; iii) an IP based protocol; iv) a SOAP protocol; v) an XML protocol; vi) an HTTP protocol; vii) an FTP protocol; viii) an Internet protocol; and ix) a device boot protocol.

It is now disclosed for the first time a peripheral device comprising: a) an inter-device interface for coupling with a host device; b) a logical protocol selector operative to: i) receive, from the host device via the inter-device interface, a plurality of commands including an ambiguous command that is syntactically valid in a plurality of different logical protocols; and ii) in accordance with an indication of a data damage risk associated with executing of the ambiguous command in a candidate protocol selected from the plurality of logical protocols, select for the ambiguous command a logical protocol from the plurality of logical protocols as a target protocol in which to interpret the ambiguous command.

According to some embodiments, the peripheral device further comprises: c) a command interpreter operative to interpret the received ambiguous command using the selected target logical protocol.

It is now disclosed for the first time a computer readable medium having stored thereon computer readable program code for performing command disambiguation for a system including a first device and a second device where the first device sends commands to be received by the second device, the program code being operable to: a) handle a plurality of commands including an ambiguous command that is syntactically valid in a plurality of different logical protocols; and b) contingent on an extent of device usage since a most recent device reset event, effect a logical protocol transition to associate the ambiguous command with a logical protocol that is different from a logical protocol used to interpret an immediate predecessor command received by the second device after the device reset event.

According to some embodiments, the program code is operable to: c) interpret the received ambiguous command using the associated logical protocol.

According to some embodiments, the program code is operable such that the logical protocol transition is a transition away from a device boot or wake-up protocol (i.e. the first protocol used by "second" or "receiving" or "peripheral" the device upon host device boot or wake up).

According to some embodiments, the program code is operable such that the device-usage-extent-contingent effecting of the logical protocol transition is contingent on the device usage extent exceeding a predetermined threshold.

According to some embodiments, the program code is operable such that the device-usage-extent-contingent effecting of the logical protocol transition is contingent on at least one of: i) a usage extent of the first device, which sends the commands; and ii) a usage extent of the second device, which receives the commands from the first device.

According to some embodiments, the program code is operable such that the device-usage-extent-contingent effecting of the logical protocol transition is contingent on at least one of: i) a number of commands previously received by the second device from the first device since the most recent device reset event; ii) a number of commands previously executed by the second device since the most recent device reset event; iii) a time elapsed since the most recent device reset event; and iv) a total amount of data received from the first device by the second device since the most recent device reset event.

According to some embodiments, the program code is operable such that the most recent device reset event is one of: i) a most recent device powering-up (i.e. of the host or of the peripheral); and ii) a most recent device resume-from-suspend.

According to some embodiments, the program code is operable such that the most recent device reset event is selected from the group consisting of: i) a most recent reset event of the first device, which sends the commands; and ii) a most recent reset event of the second device, which receives the commands.

It is now disclosed for the first time a computer readable medium having stored thereon computer readable program code for performing command disambiguation for a system including a first device and a second device where the first device sends commands to be received by the second device, the program code being operable to: a) handle a plurality of commands including an ambiguous command that is syntactically valid in a plurality of different logical protocols; and b) in accordance with an extent of device usage since a most recent device reset event, select: i) for the ambiguous command, ii) from the plurality of logical protocols, a logical protocol as a target protocol in which to interpret the ambiguous command, wherein the selected target logical protocol is different from an initial protocol used to interpret a first command received after the most recent device reset event.

According to some embodiments, the program code is operable to: c) interpret the received ambiguous command using the selected target logical protocol.

According to some embodiments, the program code is operable such that the device-usage-extent-contingent effecting of the logical protocol selection is contingent on the device usage extent exceeding a pre-determined threshold.

According to some embodiments, the program code is operable such that the device-usage-extent-contingent effecting of the logical protocol selection is contingent on at least one of: i) a usage extent of the first device, which sends the commands; and ii) a usage extent of the second device, which receives the commands from the first device.

According to some embodiments, the program code is operable such that the device-usage-extent-contingent effecting of the logical protocol selection is contingent on at least one of: i) a number of commands previously received by the second device from the first device since the most recent device reset event; ii) a number of commands previously executed by the second device since the most recent device reset event; iii) a time elapsed since the most recent device reset event; and iv) a total amount of data received from the first device by the second device since the most recent device reset event.

According to some embodiments, the program code is operable such that the most recent device reset event is one of: i) a most recent device powering-up (i.e. of the host or of the peripheral); and ii) a most recent device resume-from-suspend.

According to some embodiments, the program code is operable such that the most recent device reset event is selected from the group consisting of: i) a most recent reset event of the first device, which sends the commands; and ii) a most recent reset event of the second device, which receives the commands.

It is now disclosed for the first time a computer readable medium having stored thereon computer readable program code for performing command disambiguation for a system including a first device and a second device where the first device sends commands to be received by the second device, the program code being operable to: a) handle a plurality of commands including an ambiguous command that is syntactically valid in a plurality of different logical protocols; b) determine whether or not to effect a logical protocol transition in accordance with at least one target parameter of the ambiguous command; c) if the determination is a positive determination, interpret the ambiguous command, using at least one target parameter of the ambiguous command, in a target logical protocol that is different from a logical protocol used to interpret an immediate predecessor of the ambiguous command; and d) otherwise, interpret the ambiguous command in the logical protocol used to interpret the immediate predecessor.

According to some embodiments, the program code is operable such that the logical protocol transition is a transition away from a device boot or wake-up protocol (i.e. the first protocol used by "second" or "receiving" or "peripheral" the device upon host device boot or wake up).

According to some embodiments, the program code is operable such that the determining is carried out in accordance with a data access policy.

According to some embodiments, the program code is operable such that the determining is carried out in accordance with a security policy.

According to some embodiments, the program code is operable such that at least one target parameter is selected from the group consisting of: i) a sector identifier; ii) a partition identifier; iii) a block identifier; iv) a file identifier; v) a directory identifier; and vi) data object identifier.

It is now disclosed for the first time a computer readable medium having stored thereon computer readable program code for performing command disambiguation for a system including a first device and a second device where the first device sends commands to be received by the second device, the program code being operable to: a) handle a plurality of commands including an ambiguous command that is syntactically valid in a plurality of different logical protocols; b) contingent on one or more target parameters of the ambiguous command, effect a logical protocol transition to associate the ambiguous command with a target logical protocol that is different from a logical protocol used to interpret an immediate predecessor of the ambiguous command; and c) interpret N consecutive commands using the associated target logical protocol, wherein: i) a first command of the N consecutive commands is the ambiguous command; and ii) N is a positive integer whose value does not depend on the one or more target parameters of the ambiguous command.

According to some embodiments, the program code is operable such that the target-parameter-contingent logical protocol transition is carried out in accordance with a data access policy.

According to some embodiments, the program code is operable such that the target-parameter-contingent logical protocol transition is carried out in accordance with a security policy.

According to some embodiments, the program code is operable such that at least one target parameter is selected from the group consisting of: i) a sector identifier; ii) a partition identifier; iii) a block identifier; iv) a file identifier; v) a directory identifier; and vi) data object identifier.

According to some embodiments, the program code is operable such that the logical protocol transition is a transition away from a device boot or wake-up protocol (i.e. the first protocol used by "second" or "receiving" or "peripheral" the device upon host device boot or wake up).

According to some embodiments, the program code is operable to: c) interpret the received ambiguous command using the associated logical protocol.

It is now disclosed for the first time a computer readable medium having stored thereon computer readable program code for performing command disambiguation for a system including a first device and a second device where the first device sends commands to be received by the second device, the program code being operable to cause the processor to: a) handle an ordered sequence of commands including an ambiguous command that is syntactically valid in a plurality of different logical protocols; b) contingent on one or more target parameters of the ambiguous command, effect a logical protocol transition to associate the ambiguous command with a target logical protocol that is different from a predecessor logical protocol used to interpret an immediate predecessor of the ambiguous command; c) interpret N consecutive commands using the associated target logical protocol, wherein: i) N is a positive integer; ii) a first command of the N consecutive commands is the ambiguous command; and iii) no commitment is made to interpret a subsequent command, which is received after the N consecutive commands, using the predecessor logical protocol.

According to some embodiments, the program code is operable such that the logical protocol transition is a transition away from a device boot or wake-up protocol (i.e. the first protocol used by "second" or "receiving" or "peripheral" the device upon host device boot or wake up).

According to some embodiments, the program code is operable such that the target-parameter-contingent logical protocol transition is carried out in accordance with a data access policy.

According to some embodiments, the program code is operable such that the target-parameter-contingent logical protocol transition is carried out in accordance with a security policy.

According to some embodiments, the program code is operable such that at least one target parameter is selected from the group consisting of: i) a sector identifier; ii) a partition identifier; iii) a block identifier; iv) a file identifier; v) a directory identifier; and vi) data object identifier.

It is now disclosed for the first time a computer readable medium having stored thereon computer readable program code for performing command disambiguation for a system including a first device and a second device where the first device sends commands to be received by the second device, the program code being operable to: a) handle a plurality of commands including an ambiguous command that is syntactically valid in a plurality of different logical protocols; and b) in accordance with a combination of: i) one or more target parameters of one or more commands received before the ambiguous command; and ii) one or more target parameters of the ambiguous command, select for the ambiguous command a logical protocol from the plurality of logical protocols as a target protocol in which to interpret the ambiguous command.

According to some embodiments, the program code is operable to: c) interpret the received ambiguous command using the selected target logical protocol.

According to some embodiments, the program code is operable such that the target-parameter-contingent target protocol selection is carried out in accordance with a data access policy.

According to some embodiments, the program code is operable such that the target-parameter-contingent target protocol selection is carried out in accordance with a security policy.

According to some embodiments, the program code is operable such that at least one target parameter is selected from the group consisting of: i) a sector identifier; ii) a partition identifier; iii) a block identifier; iv) a file identifier; v) a directory identifier; and vi) data object identifier.

It is now disclosed for the first time a computer readable medium having stored thereon computer readable program code for performing command disambiguation for a system including a first device and a second device where the first device sends commands to be received by the second device, the program code being operable to: a) handle a plurality of commands including an ambiguous command that is syntactically valid in a plurality of different logical protocols; and b) in response to an accessing of at least one of: i) a pre-defined location in non-volatile memory of the second device which receives the commands; and ii) a pre-defined object stored in the non-volatile memory of the second device which receives the commands, select for the ambiguous command a logical protocol from the plurality of logical protocols as a target protocol in which to interpret the ambiguous command.

According to some embodiments, the program code is operable to: c) interpret the received ambiguous command using the selected target logical protocol.

According to some embodiments, the program code is operable such that the accessing is a read-accessing.

According to some embodiments, the program code is operable such that the pre-defined location is a location of a last sector of an operating system (OS) image.

According to some embodiments, the program code is operable such that the pre-defined object is an OS image.

It is now disclosed for the first time a computer readable medium having stored thereon computer readable program code for performing command disambiguation for a system including a first device and a second device where the first device sends commands to be received by the second device, the program code being operable to: a) handle a plurality of commands including an ambiguous command that is syntactically valid in a plurality of different logical protocols; and b) in accordance with a logical-protocol-dependent indication that the ambiguous command violates at least one device policy selected from the group consisting of: i) a security policy; and ii) a data access policy, select for the ambiguous command a logical protocol from the plurality of logical protocols as a target protocol in which to interpret the ambiguous command.

According to some embodiments, the program code is operable to: c) interpret the received ambiguous command using the selected target logical protocol.

It is now disclosed for the first time a computer readable medium having stored thereon computer readable program code for performing command disambiguation for a system including a first device and a second device where the first device sends commands to be received by the second device, the program code being operable to: a) handle a plurality of commands including an ambiguous command that is syntactically valid in a plurality of different logical protocols; and b) in accordance with an indication of a data damage risk associated with executing of the ambiguous command in a candidate protocol selected from the plurality of logical protocols, select for the ambiguous command a logical protocol from the plurality of logical protocols as a target protocol in which to interpret the ambiguous command.

According to some embodiments, the program code is operable to: c) interpret the received ambiguous command using the selected target logical protocol.

It is noted that features described above as pertaining to certain embodiments may also be included in other embodiments, unless indicated to the contrary hereinbelow.

BRIEF DESCRIPTION OF THE DRAWINGS

FIG. 1A shows the flow of commands sent by a source device to a destination device using a single logical protocol.

FIG. 1C describes a use case as in FIG. 1B but where a so-called "logical protocol identifier" is associated with each command.

FIG. 1D describes a use case where so-called "announcement commands" are included in the ordered sequence of commands.

FIGS. 3A-3D, 5A-5B, 7A-7B, 9A-9B, and 11A-11B are flow charts of exemplary routines for handling ambiguous commands according to some embodiments.

FIGS. 4A-4B, 6A-6B, 8 and 10 use tabular and graphical formats to describe exemplary use cases in accordance with some embodiments.

DETAILED DESCRIPTION OF EMBODIMENTS

Figure 1B:
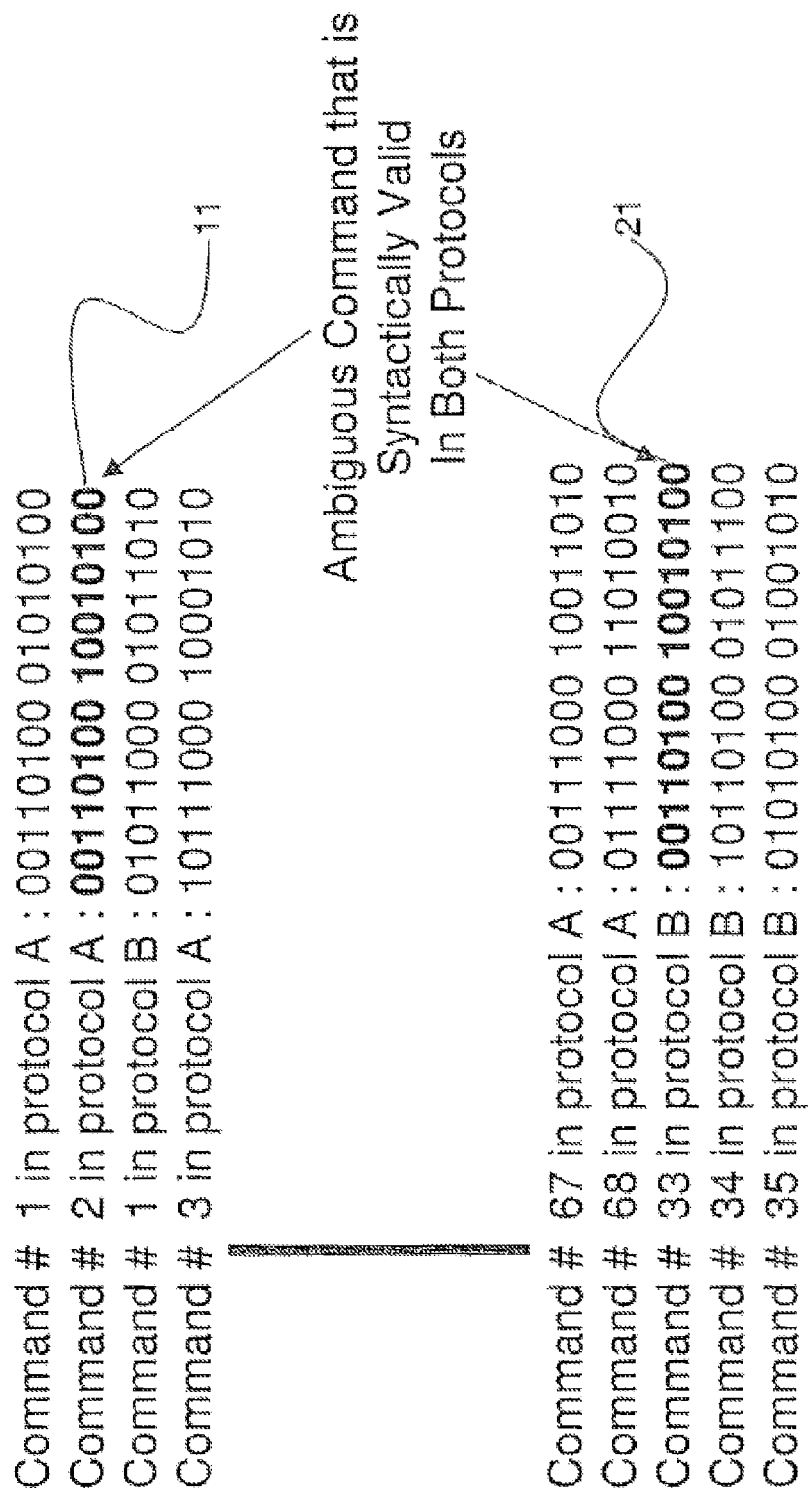
FIG. 1B shows the flow of commands sent by a source device to a destination device using two different logical protocols over the same physical interface.

The claims below will be better understood by referring to the present detailed description of example embodiments with reference to the figures. The description, embodiments and figures are not to be taken as limiting the scope of the claims. It should be understood that not every feature of the presently disclosed methods, apparatuses, and computer readable media having stored thereon computer code for logical protocol command disambiguation is necessary in every implementation. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to'), rather than the mandatory sense (i.e. meaning "must").

The present inventor is now disclosing methods, apparatuses, and computer readable media having stored thereon computer code for disambiguating "ambiguous" commands (i.e. commands that are syntactically valid in a plurality of logical protocols) with respect to logical protocols.

In some embodiments, the ambiguous command(s) are received via an inter-device physical interface that "supports" more than one logical protocol.

DEFINITIONS

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

An "announcement" is a special command to be interpreted in accordance with a logical protocol, which command may be sent by a source device to a destination device and which command notifies the destination device that subsequent command(s) will be in a specified logical protocol. The specified logical protocol may be different from that in accordance with which the announcement is to be interpreted.

An "identifier" is a prefix to a command that indicates the identity of the protocol according to which the command is to be interpreted.

An "ambiguous" command is a command that has a syntactically valid interpretation in more than one logical protocol. When multiple logical protocols are "supported" on a single physical inter-device interface, some or all of the commands sent via the physical inter-device interface may be "ambiguous" commands.

A "command interpreter" is a module (i.e. implemented in any combination of software and/or hardware) that interprets commands according to a given logical protocol. In some embodiments, the "command interpreter" resides in the destination storage device.

A "command word" is a part of a command. A command is composed of one or more command words. The length of the word may be determined by the system hardware, whereas the length of the command may be determined by the logical protocol and the complexity of the command.

A "block device protocol" is, in the context of a storage device, a protocol for accessing storage devices by using file system block-sized buffers (e.g., sectors of 512B, sector clusters, or multiple sectors). The protocol allows the storage devices to be accessed by commands that specify read sector(s) and/or write sector(s).

An "object oriented storage protocol" is a protocol used by computing systems to access storage devices, which protocol uses atomic commands for reading from, writing into, and deleting data from storage in an object of a given level. An "Object" can be, e.g.:
a file,
a directory,
an entry located in a file that consists of a database or a table (the database/table is a data structure that organizes records), a record located in a file that consists of a list of records (such as the Microsoft Outlook™ file which comprises all emails), a list of files gathered as an object by specific category (e.g., songs files gathered in one record according to singer, album, music type and so on).

"USB" or Universal Serial Bus is a logical and a physical protocol, described by the USB organization. "Media Transfer Protocol" (MTP) is a protocol used in the PC industry to communicate with USB storage devices. The MTP is an Object Oriented Storage Protocol.

"HTTP (Hypertext Transfer Protocol)" is a protocol used to transmit and receive all data over the World Wide Web. HTTP1.1, the latest version, is currently undergoing revisions to make it work more efficiently with TCP/IP.

A "current command" is a command (possibly but not necessarily an ambiguous command) most recently received by a destination device (e.g. a peripheral device) from a host device, to be interpreted by the destination device. For the interpretation of the current command a logical protocol, in which to interpret the current command, therefore needs to be selected. "Predecessor commands" are commands (not necessarily ambiguous commands) received and/or interpreted before the current command. An "immediate predecessor" command is the most recent command received by the destination device from the source device before the receiving of the "current command."

If a decision is effected to interpret the "current command" according to a logical protocol that is different from a logical protocol according to which the "immediate predecessor" was interpreted, this is referred to as a "logical protocol transition" or just a "protocol transition."

The term "target protocol" is used herein to refer to a logical protocol, selected from a plurality of candidate logical protocols, according to which a (e.g. particular) ambiguous command is to be interpreted.

It is noted that the techniques described herein are applicable to any logical protocol. Exemplary protocols include but are not limited to object oriented storage protocols, block device protocols (for example, logical block address ("LBA") protocols), IP based protocols, Simple Object Access Protocols (SOAP), XML protocols, HTTP protocols, FTP protocols, Internet protocols and device boot protocols.

Figure 2:
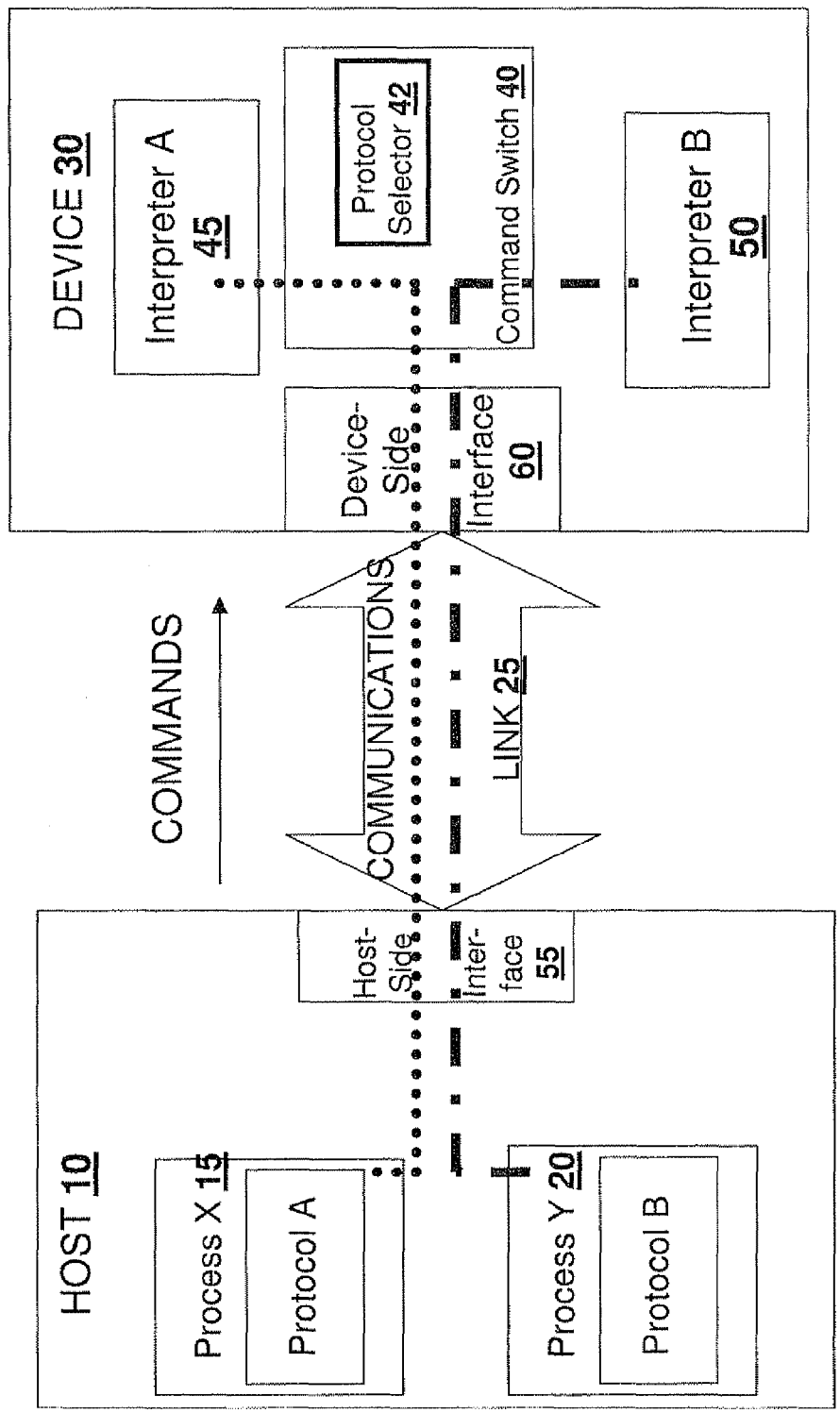
FIG. 2 is a block diagram of a system in which commands are sent from host device to peripheral device via an inter-device communications link according to some embodiments.

A Discussion of FIG. 2

FIG. 2 is a block diagram of an exemplary system in which commands are sent from host device 10 to peripheral device 30 via an inter-device communications link 25. It is appreciated that FIG. 2 is a non-limiting example, and that not every component is required in every implementation. In some embodiments, device 30 is a "transient peripheral device"— for example, a so-called flash memory data storage device such as USB flash driver or a solid state memory card. Device 30 is not limited to such a device and can be any other kind of peripheral device. Examples of host devices 10 that may be coupled with transient peripheral devices 30 include but are not limited to laptop or desktop or handheld computers, digital cameras, telephones, music players, and video game consoles.

According to FIG. 2, device 30 is coupled with host 10 via "contact" or wireless interface (see 55 and 60) and thus communicates with host 10 via a physical inter-device "communications link" 25. In one non-limiting example, host 10 includes a memory card slot (including but not limited to an MMC slot and a SD slot), and device 30 is "inserted" into the memory card slot. In yet another non-limiting example, device 30 is a so-called USB flash drive (UFD) communicating via a USB interface with host 10.

In some embodiments, communications link 25 is a "point-to-point" link and device 30 and host 10 communicate with each other "directly" without any need for an intermediary device (for example, to route communications between the device 30 and the host 10).

In some embodiments, host 10 and device 30 communicate with each other using a 'master-slave' communication protocol that has a 'host side' (used by host 10) and a 'peripheral side' (used by device 30). One example of such a protocol is the USB protocol. According to these embodiments, device 30 is the "slave" during the communication session when the ambiguous commands (i.e. relative to two or more logical protocols) are sent from host 10 to device 30. In one example, device 30 and host 10 are configured so that device 30 is always a "slave" to host 10 when coupled—the "dedicated" case. Alternatively, device 30 is only the "slave" during the particular session when the ambiguous commands are received from host 10, and device 30 is capable, in other sessions, of "playing the role of host" to host 10.

It is also possible for host 10 and device 30 to communicate with each other using a protocol other than the above-described master-slave protocol.

In the example of FIG. 2, host device 10 sends commands in either protocol A or protocol B, in either case via a single physical interface. Two applications execute on host 10. Process X 15 generates "logical protocol A commands", while process Y 20 generates "logical protocol B commands." Commands in both logical protocols are received by device 30. It is appreciated that there is no requirement to have two different processes on the host device, and that in other examples a single process generates commands to be interpreted in different logical protocols, for example, a single process generates both logical protocol A commands and logical protocol B commands.

Upon receiving the commands, command switch 40 (i) determines (or instructs) whether a particular command should be handled as a "protocol A" command or a "protocol B" command using protocol selector 42 which, for a given command, "selects" either logical protocol A or logical protocol B; and (ii) in accordance with this determination, routes the command to either command interpreter A 45 (if protocol selector 42 has selected protocol A) or command interpreter B 50 (if protocol selector 42 has selected protocol B). In the particular example of FIG. 1, command switch 40 resides on the same device as both interpreters 45, 50, but this is not required. In another example, one or more of interpreter A 45, interpreter B 50, and command switch 40 resides in a third device other than host 10 and peripheral device 30. It is further noted that the location of the blocks (elements) shown in FIG. 2 is not to be taken as requiring any physical relationship among any of the blocks. For example, protocol selector may but need not reside in the same physical entity as command switch 40, interpreter A 45 may but need not reside in the same physical entity as interpreter B 50, and so on. Of course, it will be understood that the blocks designated as process X 15 and process Y 20 do not necessarily imply that such blocks represent physical components.

It is noted that any element in FIG. 2, including but not limited to device-side interface 60, command switch 40, protocol selector 42, interpreter A 45, and interpreter B 50 or any other element described in FIG. 2 or elsewhere in the present disclosure, may be implemented in any combination of hardware, software and firmware, residing on any device or combination of devices. In one example, one or more elements are implemented at least in part in the controller of the "destination" or "peripheral" device (device 30). In another example, one or more elements are implemented at least in part as device drivers in the host or "source" device (host 10).

Furthermore, the example of FIG. 2 relates to the specific case where only two logical protocols are handled over a single physical interface—other examples where more than two different logical protocols are handled over a single physical interface are also possible.

In some embodiments, the commands sent from host 10 to device 30 are ordered in some manner (i.e. ordered sequence). In one implementation, the commands are ordered "temporally"—sent one after another in a given order. In another implementation, data describing an order of the command sequence is explicitly sent from host 10 to device 30 For example, a respective command "number" describing a respective position in the ordered sequence may be associated with each command and sent from host 10 to device 20.

Optionally, peripheral device 30 receives electrical power from host 10.

Figure 3A:
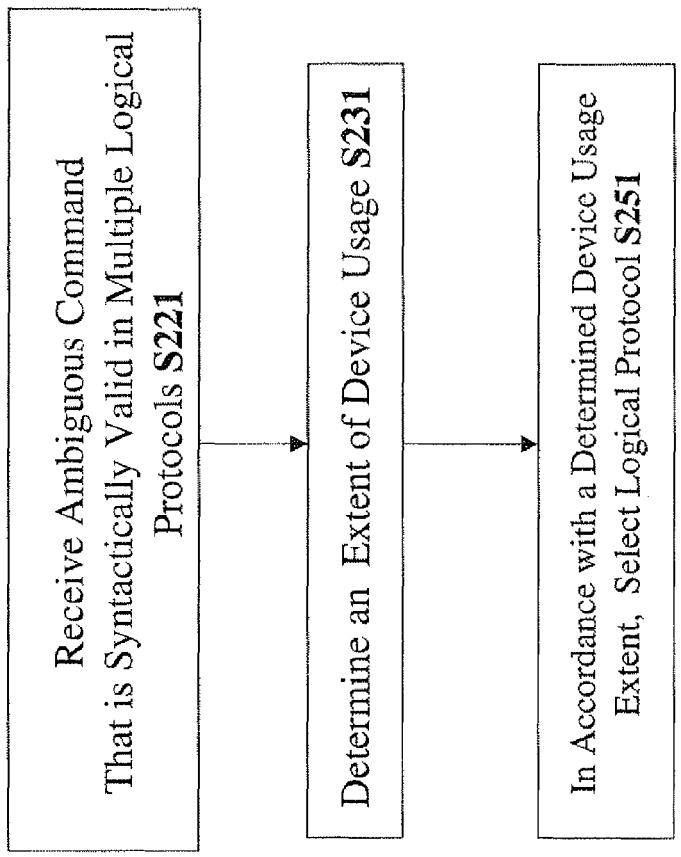

A Discussion of FIG. 3A

FIG. 3A is a flow chart of an exemplary routine for handling ambiguous commands.

In step S221, an ambiguous command that is syntactically valid in multiple logical protocols is received (for example, by device 30 from host 10). In step S231, an "extent of usage of a device" since a most recent "reset" event is determined. The phrase "extent of usage of a device" or "extent of device usage" may refer to one or more of: (i) an extent of use of the host device 10; (ii) an extent of use of peripheral device 30; (iii) an extent of use of peripheral device 30 when coupled with host device 10; and/or (iv) an extent of use of host device 10 when coupled with peripheral device 30. The extent of usage of a device could also refer to other usage of (an)other suitable (e.g. associated) device(s), as will be appreciated by one of skill in the art.

By way of further explanation, the phrase "extent of device usage" may refer to one or more of the following: (i) a non-zero number of commands (for example, a non-zero total number of commands or a non-zero number of commands of a certain type) that have been received or executed by peripheral device 30 from host 10; (ii) an amount of data that has been received by peripheral device 30 from host 10; (iii) an amount of time that has elapsed since a most recent wake-up event; (iv) some metric defining a cumulative amount of computational resources that have been consumed (for example, CPU cycles used or network resources consumed) by peripheral device 30 or host 10 or some combination thereof. The aforementioned examples do not constitute an exhaustive list; the "extent of device usage" could also refer to extents of other types of device usage.

For the present disclosure, the term "reset event" refers to one or more of (i) a power-up event of peripheral device 30—for example, a power-up event where peripheral device 30 receives electrical power from host 10; (ii) a power-up event of host 10; (iii) a "resume from suspend" or "wake-up" event of peripheral device 30; and (iv) a "resume from suspend" or "wake-up" event of host device 10. The meaning given here is not necessarily the only explanation and is not, in any way, intended to be limiting.

The logical protocol used to interpret the first command interpreted after the "reset event" may be referred to as the "initial logical protocol."

In step S251, a logical protocol in which to interpret the ambiguous command received in S221 is selected, for example, by peripheral-device-residing command switch 40. According to step S251, this logical protocol is selected in accordance with the extent of device usage determined in step S231.

Use Case I: A Non-Limiting Example of the Technique Illustrated in FIG. 3A

According to the present use case, peripheral device 30 is a non-volatile storage device which can receive both SATA protocol commands (typically used during boot time) and MTP protocol commands (typically used for writing data into storage). According to this example, peripheral device 30 is configured such that the first N commands (where N is an integer greater than or equal to 1, and may have a "small value", for example, less than 10—in one example, N is exactly one) are interpreted as SATA protocol commands, without any need for a so-called "announcement command" and without any need for an explicit identifier that identifies the commands sent from host 10 to peripheral device 30 as SATA commands.

In this example, N is a "pre-determined" threshold. For the ith command, it is determined if the value i exceeds the pre-determined value N. In the event that i does not exceed the pre-determined value N, then the ith command is interpreted in the SATA protocol. In the event that i does exceed the pre-determined value N (i.e. which will occur for the N+1th command and subsequent commands), then the ith command is interpreted in the MTP protocol.

Thus, in one non-limiting implementation, peripheral device 30 is "pre-programmed" to handle the first N commands after a reset event using a certain protocol.

In one particular use case, every subsequent command received by the peripheral device 30 after the Nth command during a given "session" (i.e. which does not include a subsequent power-off or subsequent device suspend event) is handled by peripheral device 30 as a command of the MTP protocol. Thus, in this special case, the device 30 will "transition" from the SATA to the MTP protocol after N commands after the most recent "reset" event.

A Discussion of (i) Effecting Protocol Transitions and (ii) Remaining in the Same Logical Protocol Used for the Immediate Predecessor with Reference to the Example of FIG. 3B Consider the example of FIG. 3B, which relates to the case where commands may be interpreted in one of three possible logical protocols: protocol A, protocol B, and protocol C. In the example of FIG. 3B, the first two commands are interpreted in protocol A, the next three commands are interpreted in protocol B, and the next two commands are interpreted in protocol C.

In the example of FIG. 3B, there are two "thresholds" for determining how to interpret the ith command. For each command where i is less than or equal to the First threshold of "2," protocol A is selected at step S251 of FIG. 3A (i.e. from the set {protocol A, protocol B, protocol C}) and used to interpret the ith command.

For each command where i is less than or equal to the second threshold of "5" but exceeds the first threshold of "2," protocol B is selected at step S251 of FIG. 3A (i.e. from the set {protocol A, protocol B, protocol C}) and used to interpret the ith command.

For each command where i exceeds the first threshold of "5," protocol C is selected at step S251 of FIG. 3A (i.e. from the set {protocol A, protocol B, protocol C}) and used to interpret the ith command.

Thus, for "command 2," the same logical protocol (i.e. logical protocol A) is selected at step S251 (FIG. 3A) as was used to interpret the immediate predecessor of command 2—i.e. "command 1." However, for "command 3," a logical protocol (i.e. logical protocol B) is selected at step S251 (FIG. 3A) that is different from the logical protocol used to handle the immediate predecessor of command 3—i.e. "command 2."

Thus, for the first case (i.e. the protocol selection at step S251 (FIG. 3A) for command 2), the "protocol selection" represents a decision to remain with the same protocol that was used for the immediate predecessor.

In contrast, for the second case (i.e. the protocol selection at step S251 (FIG. 3A) for command 3), the "protocol selection" represents a decision to "effect a logical protocol transition"—i.e. to interpret command 3 in a logical protocol that is different from a logical protocol that was used to interpret the immediate predecessor of command 3 (i.e. command 2).

Figure 3C:
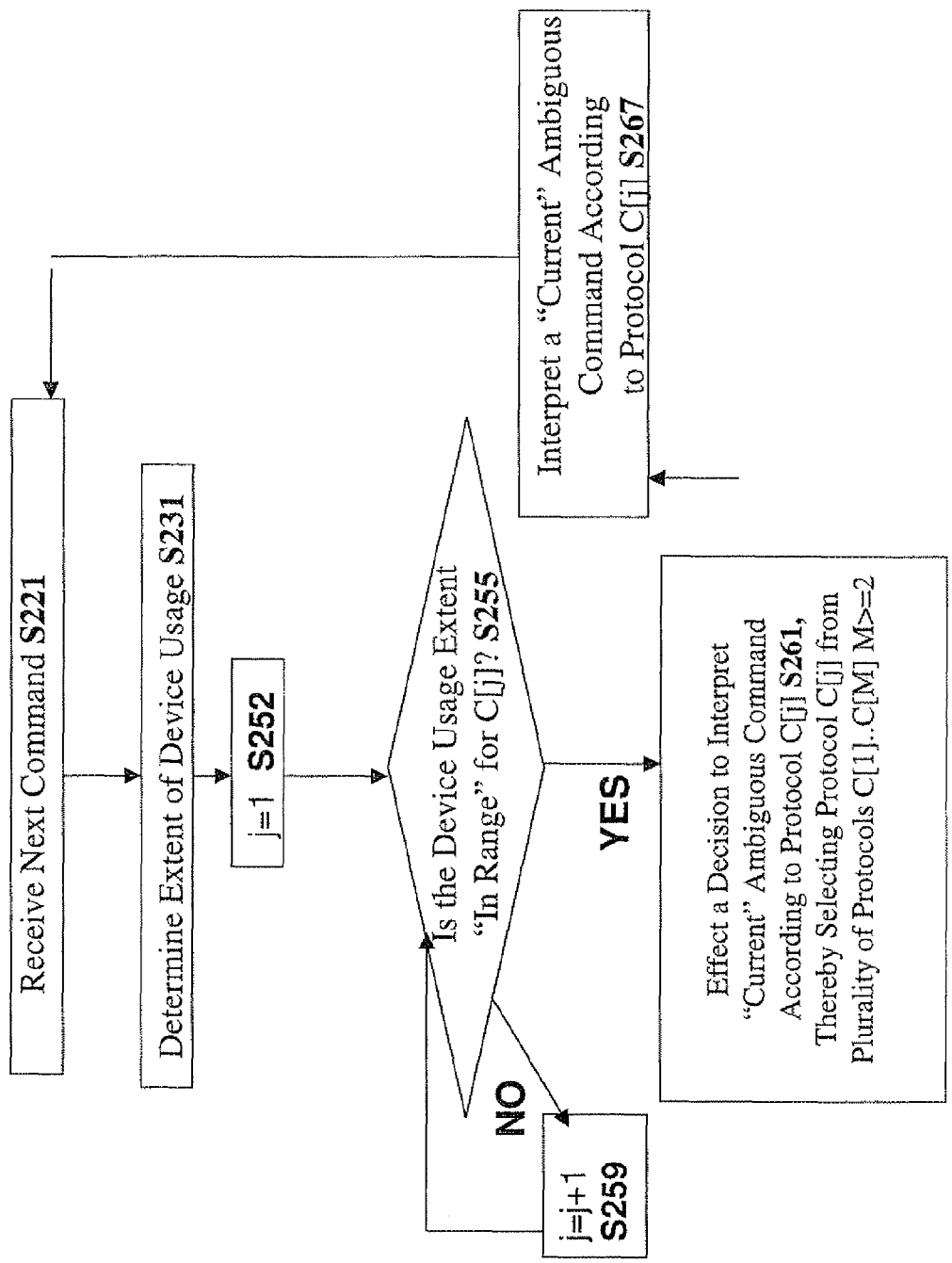
Figure 3D:
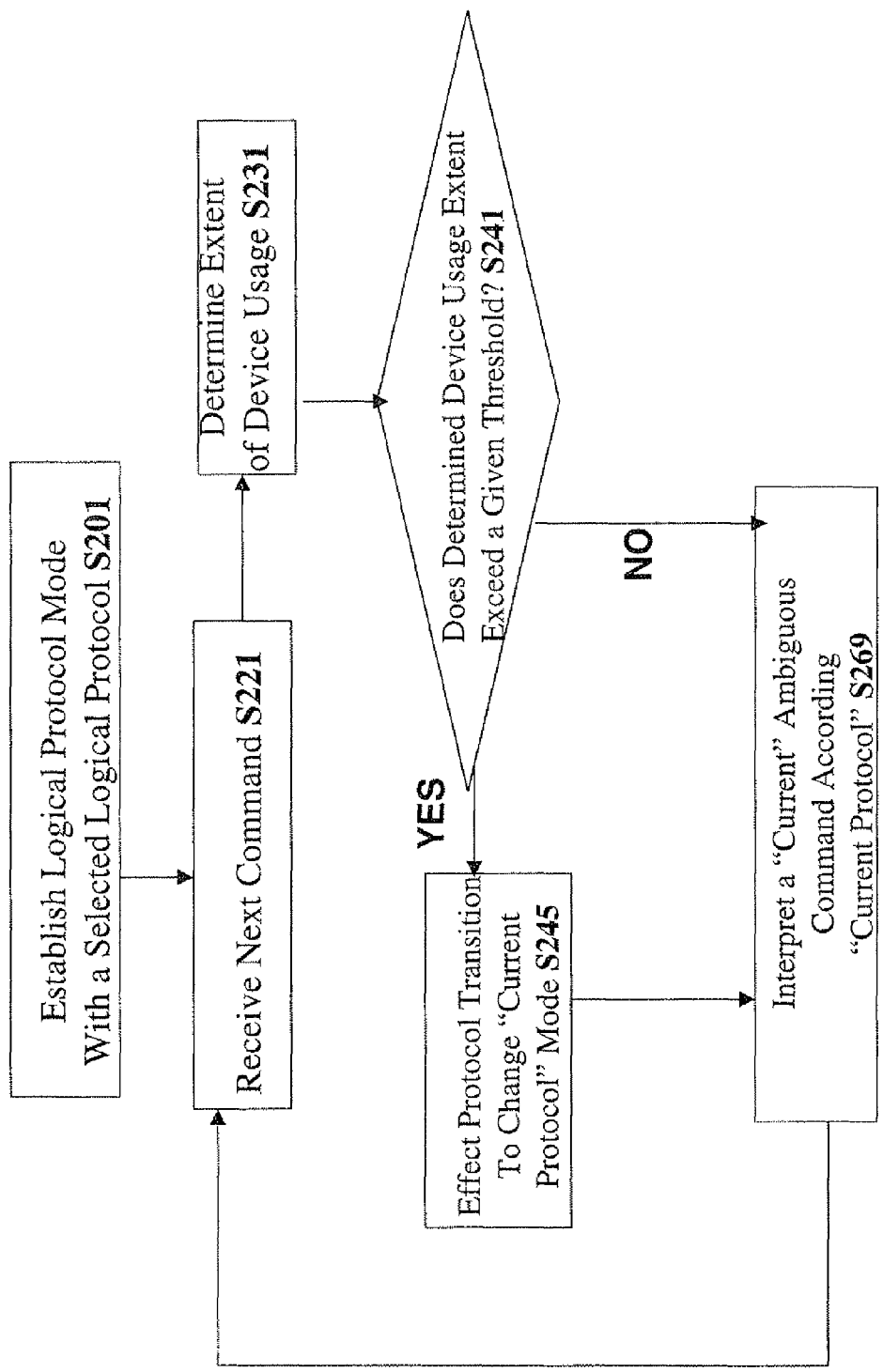

A Brief Discussion of FIGS. 3C-3D

FIGS. 3C-3D describe certain implementations of the technique described in FIG. 3A.

FIG. 3C provides a flow chart of a routine for determining in which protocol to interpret an ambiguous command in accordance with an extent of device usage since a most recent reset event. In response to peripheral device 30 receiving a command from host 10, an extent of device usage is determined S231 for example, by peripheral device 30. In the example of FIG. 3A, any particular command may be interpreted in any one of possible logical protocols (where M is an integer greater than or equal to 2), which are represented by C[1], C[2] ... C[M]. Thus, in steps S252, S255, and S259, one or more logical protocols are "iterated through" until a logical protocol is found at step S255 that satisfies a predetermined "device usage extent" condition.

In step S261, a decision is made to interpret the "current" ambiguous command according to the protocol C[j] which was selected in steps S252, S255 and S259. In step S267, the "current" ambiguous command is interpreted according to protocol C[j] which was selected in steps S252, S255 and S259.

In the example discussed in an earlier section ("Use Case I: A Use Case Related to the Technique of FIG. 3A"), for the SATA protocols, the "extent of device usage" is a number of commands received by the peripheral device 30 from host 10 since a most recent reset. Thus, in this example, M=2 (i.e. two possible protocols), C[1]=SATA, and C[2]=MTP.

Consider the special case where N=3 (i.e. only the first three commands are handled in SATA and all subsequent commands are handled in MTP). For this case, when handling the "first command" or "second command" or "third command" since a most recent reset event (i.e. the first three times S221-231 are carried out), C[1] is set to SATA in step S255. At the time, the "elapsed device usage" (extent of device usage) is "in range" for the SATA protocol (i.e. because we are handling the first three commands since a most recent event) (i.e i is less than or equal to three for the ith command). Thus, the first three times S255 is carried out, the flow branches immediately to S261 and S269 with j=1.

Upon handling the fourth command in step S255, when i=4, the "elapsed device usage" is now "out of range" for C[1]=SATA. In this case, we branch to S259 to increments, and when j=2, we are "in range" for C[2]=MTP.

Thus, in the technique of FIG. 3A, the "initial protocol" (i.e. the first protocol used immediately after the reset event) may be rejected during the fourth execution of step S221 (i.e. when handling the fourth command). Thus, the technique of FIG. 3A is useful for determining use of a protocol other than the "initial protocol." In the present example, the initial protocol is SATA and the technique of FIG. 3A is used to select for command interpretation the MTP protocol for the fourth and subsequent commands.

The presently-described embodiments relate to the situation when commands are received by peripheral device 30 from host 10 in an ordered sequence—i.e. Command$_1$, Command$_2$ . . . . A "command protocol transition" occurs when a first command (i.e. the ith command where i is a positive integer) is interpreted in a first logical protocol, and an immediate next command (i.e. the (i+1)th command) is interpreted in a second logical protocol different from the first logical protocol.

Thus, in the current example where N=3, the third command is interpreted using the SATA protocol, and the fourth command (and all subsequent commands) is interpreted using the MTP protocol. In this example, a "protocol transition" is carried out when handling interpreting or handling the fourth command, and no protocol transition is carried out when handling the fifth command (i.e. because both the fourth and fifth command are interpreted using the same protocol).

FIG. 3D is a flow chart of a technique for effecting protocol transitions in accordance with the technique of FIG. 3A.

In the implementation of FIG. 3D, a logical protocol mode is first established in step S201—for example, protocol "A". In steps S221 and S231, the next command (i.e. an ambiguous command that is syntactically valid in multiple logical protocols) is received, and an extent of device usage is determined, respectively. In the event that the determined extent of device usage exceeds a given threshold (step S241) (for example, a given "number of commands threshold" since a most recent peripheral device reset event), then a "transition" is effected at step S245 so that the "current protocol," in which a command is to be interpreted, changes. Otherwise, if no transition is effected, we remain in a protocol used to interpret the immediate predecessor.

In step S269, the command is interpreted in accordance with the "current protocol." In the event that a transition has been undertaken in steps S241-S245, then in step S269, there is a new "current protocol" and the command is interpreted according to a protocol different than that used for a command immediately before the "current command" (i.e. the immediate predecessor command in the ordered sequence of commands). Otherwise, the interpreting of step S269 is carried out using the same logical protocol used for the immediate predecessor command.

Thus, in the example where the first three commands are interpreted using the MTP protocol and the fourth command (and subsequent commands) are interpreted using the SATA protocol, then the first three times step S241 is reached, the answer is "no" and we proceed directly to step S269, where the "current protocol" is MTP. In this example, the fourth time step S241 is reached, the answer is "yes" and a protocol transition is effected in step S245 (i.e. thereby changing the "current protocol" from SATA to MTP) before the fourth command is interpreted in step S269. In this example, for all subsequent commands, upon reaching step S241, the answer is "no" and there are no more protocol transitions (in step S245).

In the present examples, the "elapsed device usage" is the single determining factor for determining which logical protocol to use in interpreting a command. However, as will be discussed below, the logical protocol (or a decision of whether or not to effect a logical protocol transition) may be determined in accordance with one or more additional factors instead of or in addition to "elapsed device usage".

Use Case II: A Use Case Described in FIG. 4A which Relates to the Technique of FIG. 5A Before explaining, with reference to FIG. 5A, a specific technique for determining a logical protocol in accordance with one or more command parameters, a non-limiting use case is discussed with reference to FIG. 4A.

It is noted that although specific examples of command parameters are disclosed, there is not limitation on the type of command parameters. Exemplary parameters include but are not limited to i) a sector identifier; ii) a partition identifier; iii) a block identifier; iv) a file identifier; v) a directory identifier; and vi) data object identifier (e.g. photo album, music record, etc.).

In the example of FIG. 4A, a storage device 30 receives commands from a host device 10. In the table provided in the figure, four ambiguous commands are described: commands 53 (i.e. the 53$^{rd}$ command in an ordered sequence of commands), 54, 55 and 56.

In the third column, appears the respective "command string" (i.e. the command word together with the target command parameter) for each command. Each command is ambiguous because each command has a valid syntax in more than one logical protocol.

In the present example, the command word length in logical protocol A is 8 bits, and the command word length in logical protocol B is 10 bits. For protocol A, the "target parameter" has a length of 8 bits and for protocol B the "target parameter" has a length of 6 bits. Thus, ambiguous command 53 may be interpreted in protocol A as "00110100" or the "READSECTOR" command word with target parameter "01010100" or 84, as shown in the second column in the table in FIG. 4A. In protocol B, ambiguous command may be interpreted as "0011010001" or the "CMD_X" command with target parameter "01010100" or 20, as shown in the fourth column in the table in FIG. 4A. Syntactically valid interpretations of commands 54-56 are also provided in the table.

In the example of FIG. 4A, the storage device has 256 sectors—thus, any command to read from or write to sectors 0-255 does not violate the "range policy" or "sector policy" while any command to read from or write to sectors 256-511 does violate the "range policy" or "sector policy." Thus, commands 53-54 and 56 in protocol A do not violate any "range policy", while command 55 in protocol A does violate a "range policy." It is assumed in the example of FIG. 4A that no command in protocol B violates any "range policy."

In the example of FIG. 4A, command 52 was interpreted using command protocol A, and there is a bias in favor of the "most recently used logical protocol."—i.e. as long as interpreting the "current command" using the "most recently used logical protocol" does not violate the pre-determined range policy (i.e. in this case a sector range policy), then the current command will be interpreted using the most recently used logical protocol.

For this reason, commands 53 and 54 are interpreted using command protocol A.

Command 55 is not interpreted using protocol A. Even though command A is syntactically valid under logical protocol A, it violates a range policy. For this reason, when interpreting command 55, a logical protocol transition is effected from logical protocol A to logical protocol B. In the current example, neither "CMD_Z 23" nor "CMD_Y 21" violate a range policy. Thus, when deciding which logical protocol to use to interpret command 56, it is decided to continue employing logical protocol B (i.e. the logical protocol used when interpreting command 55), because there is no need to transition away from logical protocol B—the most recently used logical protocol—when interpreting command 56.

Thus, there is only one "logical protocol transition"—upon handling command 55 as shown by the arrow in FIG. 4A.

Use Case III: A Use Case Described in FIG. 4B which Relates to the Technique of FIG. 5B Before explaining, with reference to FIG. 5B, a specific technique for determining a logical protocol in accordance with one or more command parameters, a non-limiting use case is discussed with reference to FIG. 4B.

The table shown in FIG. 4B shows the same commands as those shown in FIG. 4A. However, in FIG. 4B, the bias differs from that of FIG. 4A.

In the example of FIG. 4A, there is a "bias" in favor of the "current logical protocol"—i.e. as long as the current logical protocol does not violate a pre-determined range policy, this is the protocol that is adopted.

In the example of FIG. 4B, there is a "bias" in favor of logical protocol A—i.e. first it is ascertained if the command, as interpreted in logical protocol A—violates the pre-determined range policy. If the command does indeed violate the range policy, then the command is interpreted according to logical protocol B. If the command does not violate the range policy, then the command is interpreted according to logical protocol A—even if this property of "not violating a range policy" is shared with logical protocol B.

Thus, in FIG. 4B, command 56 is interpreted in logical protocol A, in contrast to the use case of FIG. 4A. This is because command 56 does not violate a range policy when interpreted in logical protocol A. Thus, as shown in FIG. 4B, there is a logical protocol transition not only upon handling command 55 (as in FIG. 4A) but also upon handling command 56, as indicated by the arrow on the left side of the row including command 56.

Figure 5B:
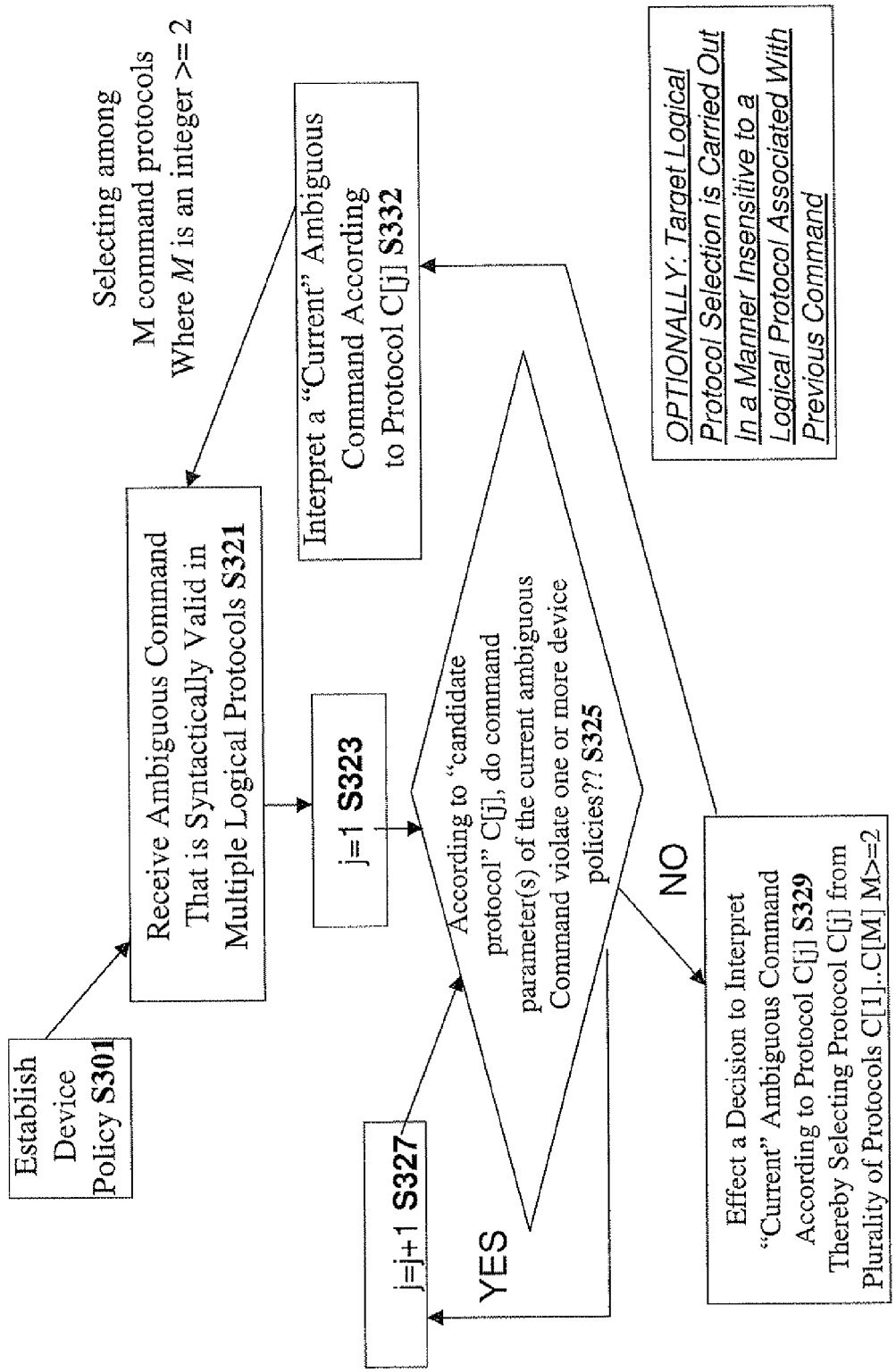

A Description of FIGS. 5A-5B: Exemplary Techniques for Determining a Target Logical Protocol and/or Handling a Protocol Transition in Accordance with One or More Command Parameters Reference is now made to FIG. 5A. In FIG. 5A, a predetermined device policy (for example, a range policy, security policy, etc) is established in step S301. In the use case of FIG. 4A, this device policy was a "range" or "data access" policy. In another example, the policy is a "security" policy, such that, if target command parameters associated with executing the command in one logical protocol are associated with a violation of a security policy, then the command is interpreted using a different logical protocol.

A "data access" policy refers, e.g. to a policy dictating whether access to particular data objects and/or particular locations in which data is stored is permitted or forbidden.

A "security policy" refers, e.g. to a policy capable of permitting, restricting, or preventing access, operations, services, or the like, conditioned upon identification, authentication, verification or the like.

The above descriptions of "data access" policy and "security" policy are intended and understood to be consistent with the respective usages of those of skill in the art, and these terms are to be construed as broadly as possible in that light.

In step S311, one or more commands (i.e these commands are optionally ambiguous commands) are handled according to a particular logical protocol. In step S321, an ambiguous command is received. In step S331, it is assessed (i.e. determined or estimated) if the target parameters of one or more commands (for example, the "current" ambiguous command) violate the pre-determined device policy (for example, a range/access policy or a security policy) In the event that one or more target parameters (i.e. associated with the command (s)) do violate the target policy, then a logical protocol transition is effected S341). This is called making a "positive determination" to effect a logical protocol transition (i.e. taking the "yes" branch leaving step S331 into step S341).

In step S345, the command is interpreted according to a "current logical protocol" (i.e. either with no transition if the target parameters of the command do not violate the device policy and the "no" branch of step S331 is accordingly selected, or after the command transition of step S341).

It is noted, in FIG. 5A, that there is a "bias" in favor of the most recently used logical protocol—i.e. as long as the most recently used logical protocol (i.e. the protocol used to interpret an immediate predecessor command) remains acceptable according to the criteria defined in step S331, then the "current" command is interpreted in step S345 using the same logical protocol that was used to interpret the immediate predecessor.

Reference is now made to FIG. 5B.

In FIG. 5B, a predetermined device policy is established in step S301. When handling an ambiguous command in step S321, one or more candidate protocols C[j] are considered (see steps S323, S325, S327 and S329) in accordance with one or more command parameters associated with the "current" ambiguous command or one or more previous commands. Upon making an assessment (i.e. determination or estimation) that interpreting a command according to a protocol C[j] does not violate a policy (i.e. the "NO" branch of step S325), the command is interpreted in step S332 using this command protocol.

In contrast to the example of FIG. 5A where no protocol transition is effected unless it is determined in step S331 that the logical protocol used to interpret the immediate predecessor violates one or more device policies (i.e. in FIG. 5A there is a 'bias' in favor of a most recently used logical protocol—thus that selection of a protocol in which to interpret a 'current command' is carried out in accordance at least in part with a protocol used to interpret an immediate predecessor), in the example of FIG. 5B there is no such requirement. Thus, it is written in FIG. 5B that "optionally—the target protocol selection is carried out in a manner that is insensitive to a logical protocol associated with a previous command—for example, an immediate predecessor.

A Few Additional Observations about FIGS. 5A-5B

In both the examples of FIG. 5A-5B, as explained below, command parameters may be used in two ways: (i) for determining a logical protocol (for example, by command switch 40) and (ii) subsequently, for interpreting the command (for example, by inte rpreter A 45 or interpreter B 50).

In FIG. 5A, it is noted that in steps S331 and S345, certain command parameter(s) of an ambiguous command may serve two different purposes: (i) in step S331 the parameter(s) are analyzed to determine whether or not to effect a protocol transition; (ii) in step S345, the parameter(s) of the ambiguous command are used to actually interpret or execute the ambiguous command. This executing of the ambiguous command is carried out either in (A) the same protocol used for interpreting the immediate predecessor command of the "current command"—i.e. in the event that the result of step S331 is 'no' and there is no protocol transition, or (B) a "new" protocol different from the protocol used to interpret the immediate predecessor command—i.e. in the event that the result of step S331 is "yes" and there is a protocol transition.

In FIG. 5B, it is noted that in steps S325 and S332, certain command parameter(s) of an ambiguous command may serve two different purposes: (i) in step S325 the parameter(s) are analyzed to determine whether or not to select protocol C[j]; (ii) in step S332, the parameter(s) of the ambiguous command are used to actually interpret or execute the ambiguous command.

Use Case IV: A Use Case Described in FIG. 6A which Relates to the Technique of FIG. 7A Before explaining, with reference to FIG. 7A, a specific technique for determining a logical protocol in accordance with command parameters of multiple commands, a non-limiting use case is discussed with reference to FIG. 6A.

Use Case IV relates to the case where a logical protocol (i.e. for interpreting a given command) is selected in accordance with a determination of whether a combination of command parameters associated with multiple commands—(i) target parameter(s) of a "current" command and (ii) target parameter(s) of one or more previous commands—violates a range policy.

As with the example of use cases II-III, in use cases IV-V it is a requirement to not violate a range policy (e.g. to not read from or write to sectors 256-511).

In use cases IV-V, protocol C includes two commands: READSECTOR (i.e. for reading a sector specified by the command target parameter) and READFWRD (i.e. for reading a sector whose value is the sum of the most recently read sector and the command target parameter).

In the present example, the command word in logical protocol C is 8 bits, and the command word in logical protocol D is 10 bits. The "OP CODE" (i.e. the portion of the instruction, in binary, that specifies the operation to be performed) for READSECTOR is "10110100" and the "OP CODE" for READFWRD is "00110100." It is assumed that none of the commands in protocol D violate any range policy.

In Use Case IV, command number 90 was interpreted according to protocol C.

According to protocol C, the target sector to be read for command 91 is 199, which is within the pre-defined "valid" range of 0-255. In Use Case IV, command 91 is therefore interpreted in protocol C, because (i) the most recent command—i.e. command 90—was interpreted in protocol C; and (ii) the target sector of command 91 does not violate any range policy.

In command 92, the "candidate" target sector to be read, is 199+195=394 which is not in the pre-defined valid range. For this reason, command 92 is not interpreted according to protocol C, but rather according to protocol D. Thus, as indicated in FIG. 6A, a protocol transition is effected when handling command 92.

It is noted that the when determining a logical protocol for command 92, the parameters of both command 91 and command 92 are used. Thus, in the example of FIG. 6A, the target parameters of a plurality of commands—i.e. both the current command and a previous command—are used. In the example of FIG. 6A, a "logical protocol transition decision" about whether or not to effect a logical protocol transition is effected in accordance with parameters of more than one command.

No command among commands 92-94 is associated with target parameters that violate any pre-determined "range" policy for protocol D. As such, there is no need to effect a protocol transition back to protocol C, and all commands of commands 92-94 are interpreted according to protocol D. Therefore, it is written in FIG. 6A that there is a "bias" in favor of a most recently used logical protocol.

Use Case V: A Use Case Described in FIG. 6B which Relates to the Technique of FIG. 7B Before explaining, with reference to FIG. 7B, a specific technique for determining a logical protocol in accordance with command parameters of multiple commands, a non-limiting use case is discussed with reference to FIG. 6B.

In Use Case V described in FIG. 6B, the commands are the same as in Use Case IV described in FIG. 6A. However, in Use Case V, instead of having a default or "bias" in favor of a most recently used logical protocol, there is a bias in favor of protocol C.

Thus, when handling command number 93, it is determined that (i) the target parameter of command 93 (i.e. according to protocol C) is 15; (ii) this target parameter of 15 does not violate any range policy. Therefore, command 93 is handled according to protocol C and another protocol transition (i.e. indicated by the arrow at the left hand side of the row in FIG. 6B) is effected for command 93 Command 94 is also handled according to protocol C.

In Use Case V, command number 90 was interpreted according to protocol C.

FIGS. 7A-7B

Figure 7A:
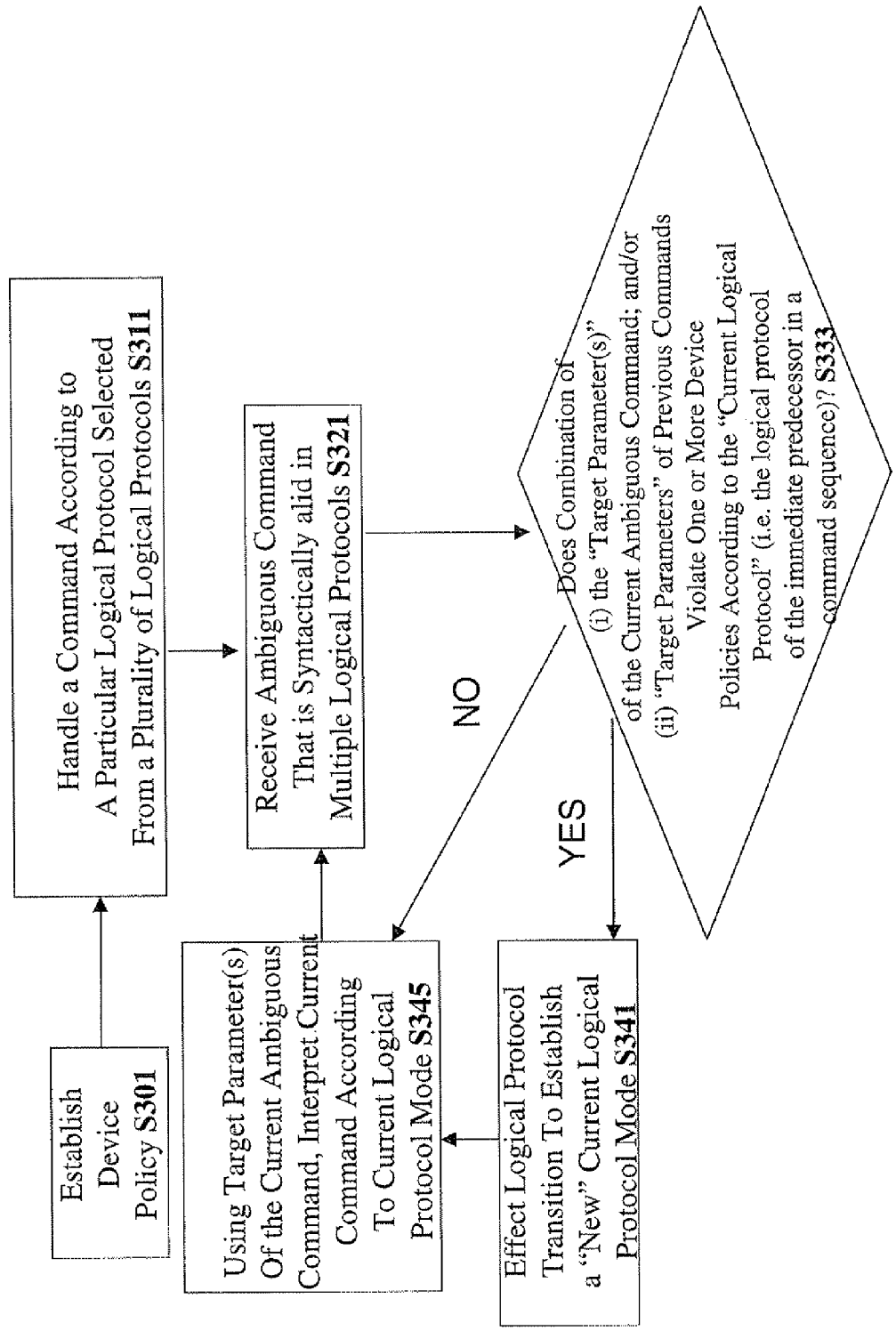
Figure 7B:
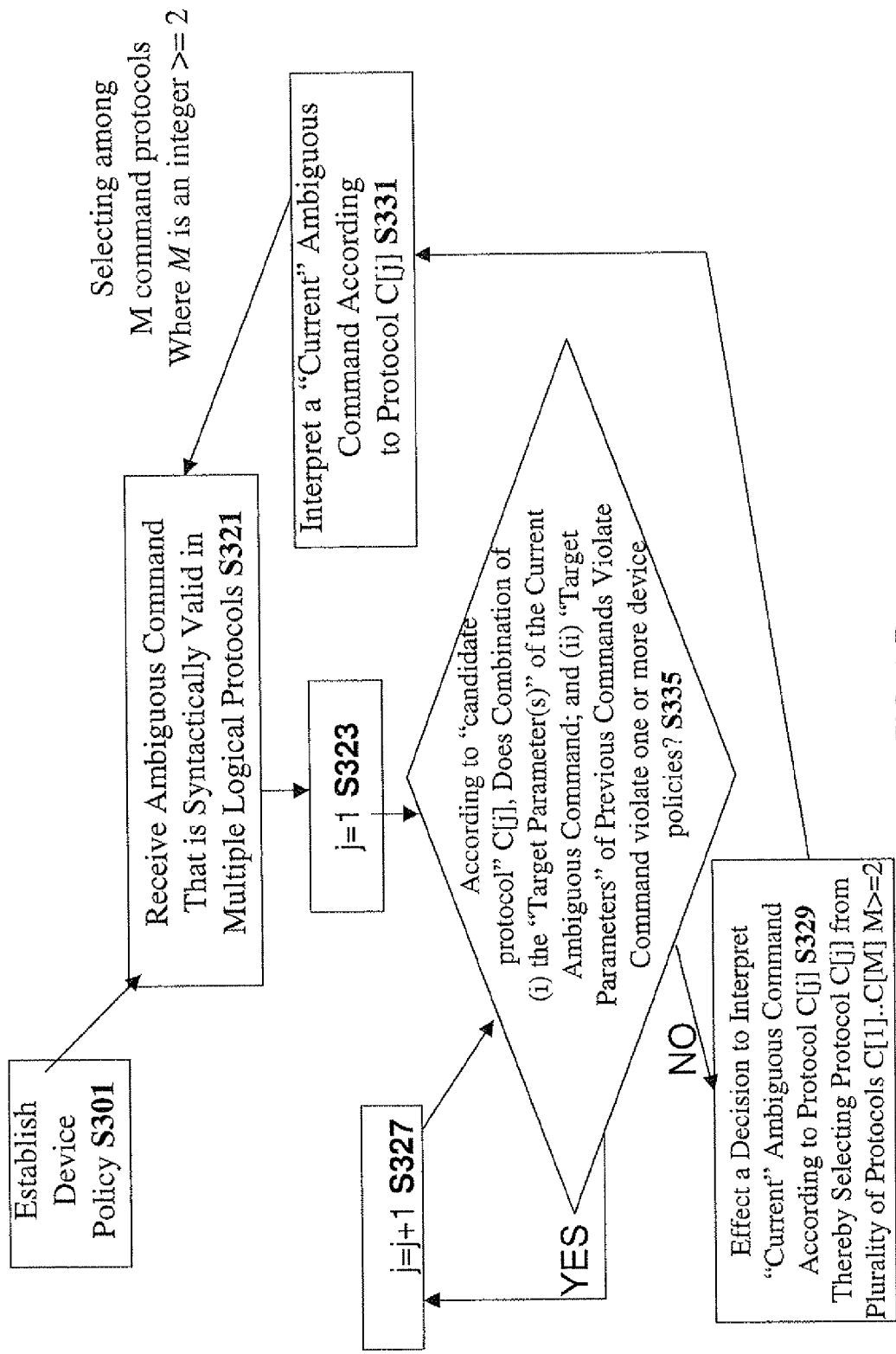

In FIGS. 7A-7B, techniques for command logical protocol disambiguation in accordance with command parameters for (i) multiple commands and (ii) previous commands are disclosed.

Reference is now made to FIG. 7A.

In step S301, a predetermined device policy is established. In step S311, a command is handled according to a particular logical protocol selected from a plurality of logical protocols. In step S321, an ambiguous command that is syntactically legal in multiple logical protocols is received. In step S333, it is assessed if the combination of (i) the target parameter(s) of the current ambiguous command; and/or (ii) target parameter (s) of one or more previous commands violate one or more device policies according to the "current logical protocol" (i.e. the logical protocol of the immediate predecessor in a command sequence).

If the answer is "yes," a logical protocol transition is effected to establish a "new" current logical protocol mode, in step S341. If the answer is no, then in step S345, a current command is interpreted using the target parameter(s) of current command, according to the "current" logical protocol.

Reference is now made to FIG. 7B.

In step S301, a predetermined device policy is established. In step S311, a command is handled according to a particular logical protocol selected from a plurality of logical protocols. In step S321, an ambiguous command that is syntactically legal in multiple logical protocols is received.

The loop defined in steps S323, S335 and S327 identifies a protocol where the combination of (i) the target parameter(s) of the current ambiguous command; and/or (ii) target parameter(s) of one or more previous commands do NOT violate one or more device policies, by looking through one or more protocols of the array C[1]...C[M] M>=2. Depending on the result of step S335, the flow proceeds to step S329, in which a decision is effected to interpret the "current" ambiguous command according to protocol C[j], or to step S331, in which the current ambiguous command is interpreted according to the selected protocol C[j].

Use Case VI: A Use Case Described in FIG. 8 which Relates to the Technique of FIG. 9

Before explaining, with reference to FIG. 9, a specific technique for effecting a logical protocol response (i.e. selecting a logical protocol or determining whether to effect a logical protocol transition, in response) to specific non-volatile memory access events, a non-limiting use case is discussed with reference to FIG. 8.

Figure 8:
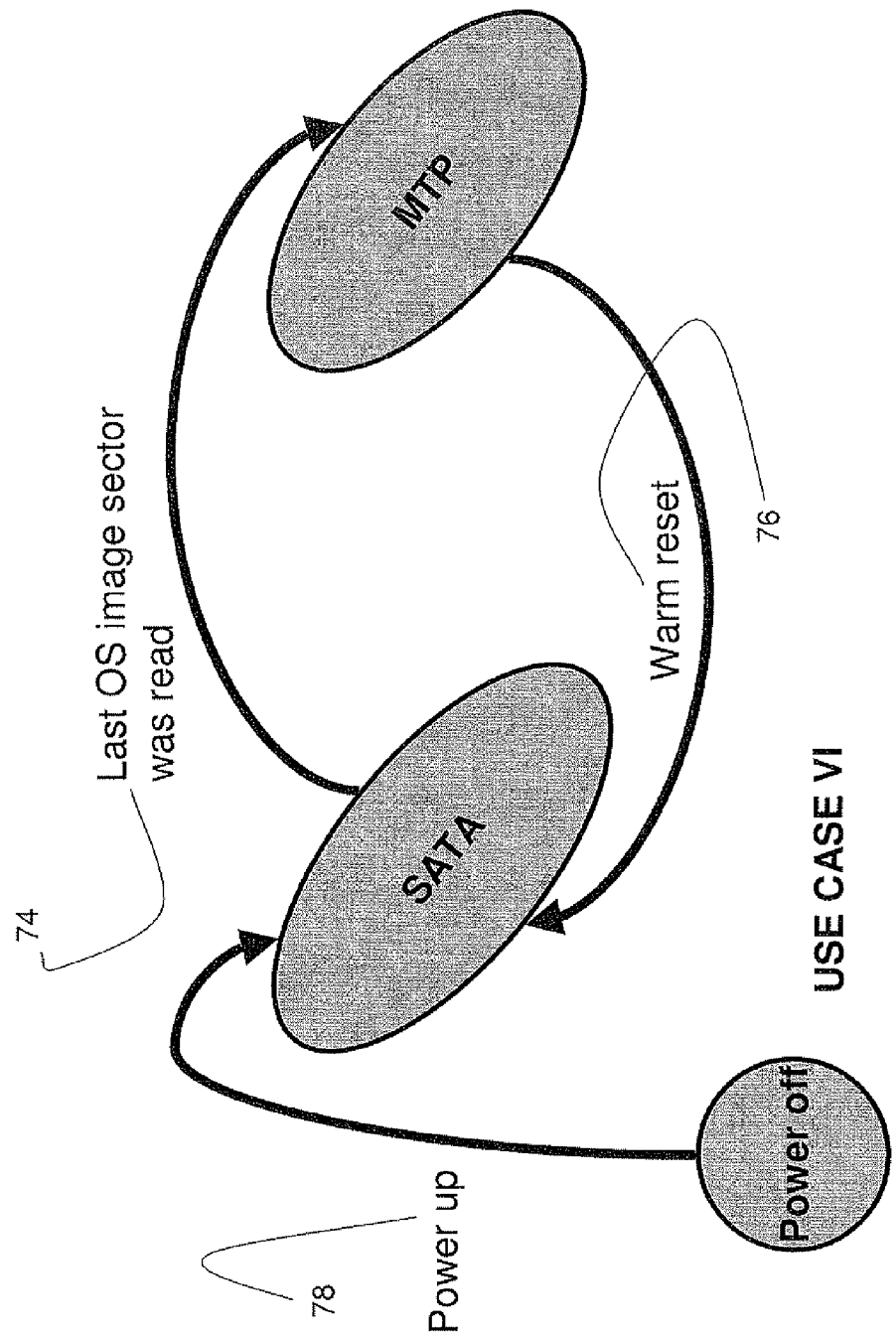

The use case described in FIG. 8 relates to the switching from a SATA protocol (typically used during boot time) to an MTP protocol (typically used for writing data into storage).

In this example, storage device 30 is programmed to switch between the SATA and MTP protocols e.g., depending on certain events. Upon power up 78 or warm reset 76 (i.e. examples of "device reset"), the storage device 30 automatically switches to SATA. Upon detection of reading of the last sector of the OS image 74 within the storage device 30 (indicating the termination of the boot process), the storage device 30 automatically switches to MTP and stays there.

Figure 9A:
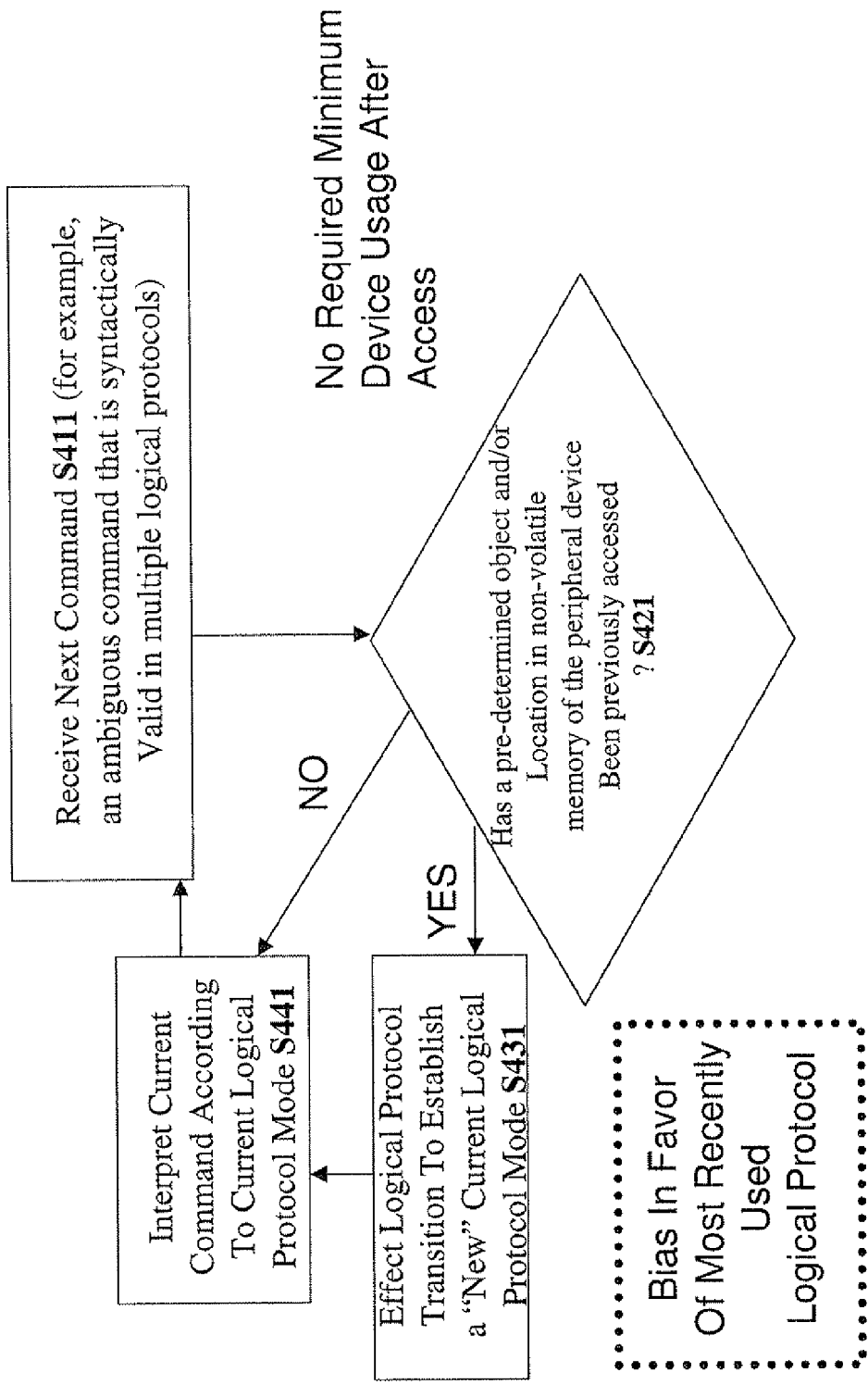
Figure 9B:
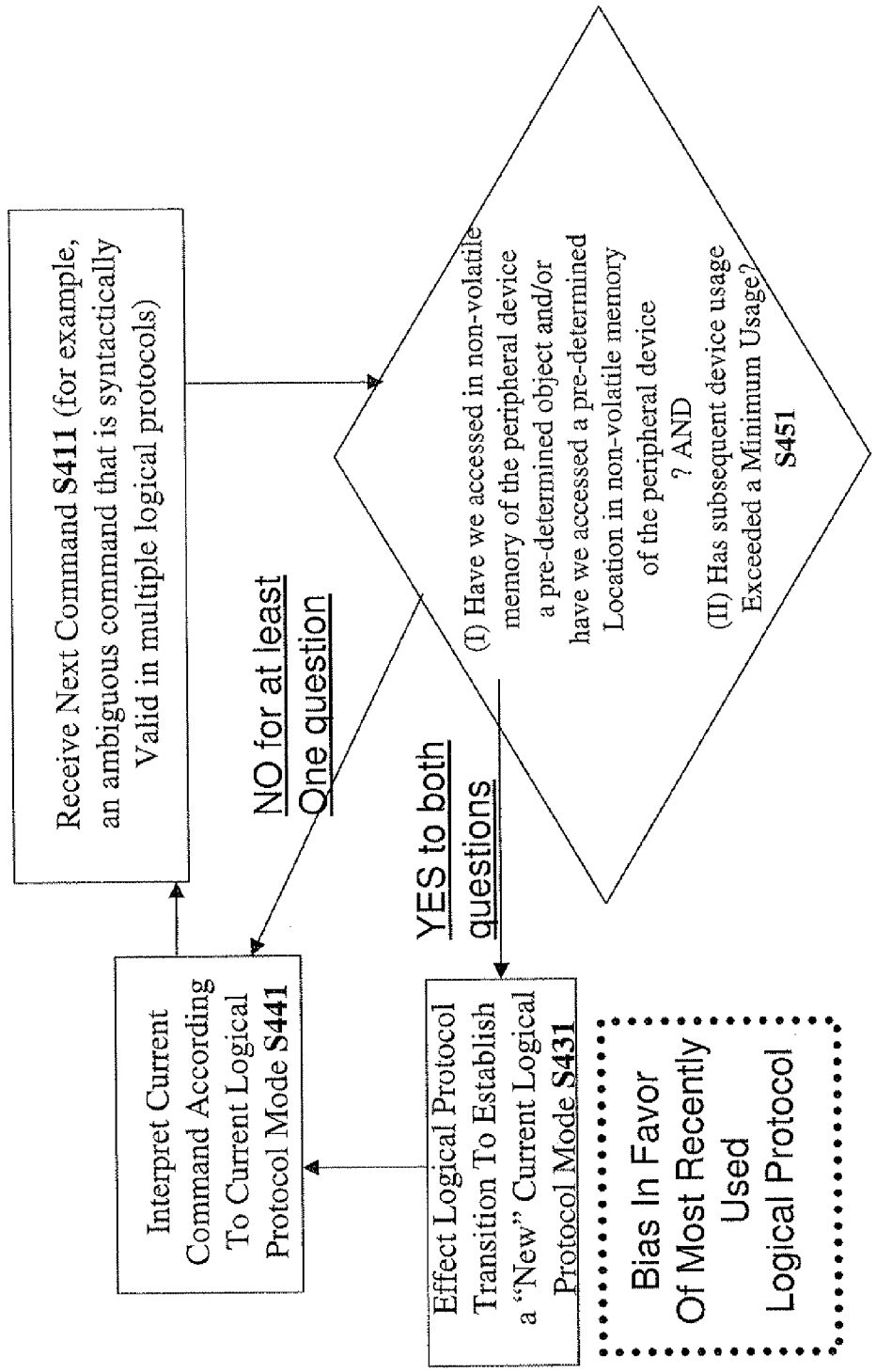

A Description of FIGS. 9A-9B: Selecting a Logical Protocol According to a Detection of a Previous Accessing of an Object and/or Location in Non-Volatile Memory of the Destination Device FIG. 9A is a flow chart according to some embodiments of a routine for determining a logical protocol in which to interpret an ambiguous command that is syntactically valid in multiple logical protocols. In step S411, a next command is received by the destination (e.g. peripheral) device from the source device. In step S421, an assessment (i.e. determination or estimate) is made if an object or location in non-volatile memory of the destination device (for example, a storage device such as an SD card or a UFB flash drive) has been previously accessed.

As discussed with respect to FIG. 8, one example of an "object" is OS image 74. Nevertheless, it is appreciated this is not a limitation, and objects other than OS images could be used.

One example of a "predetermined location" in non-volatile memory is a location in non-volatile memory (for example, (a) particular sector(s), partition(s) or block(s)) in which OS image 74 resides. Nevertheless, it is appreciated that this is not a limitation, and that other locations could be used.

FIG. 9A illustrates the specific case where a decision of whether or not to effect a "protocol transition" is made, and the case of a "bias in favor of a most recently used logical protocol." The system is not limited to this bias, and in other embodiments, the bias may be in favor of a specific protocol, or there may be any other bias.

In the non-limiting example of FIG. 9A, a protocol transition is made when handling the first command after the detection of the accessing of the object and/or location of the non-volatile memory. In another example, the transition is made after the Nth command after the accessing of the object and/or location where N is an integer greater than 1. In yet another example, the transition is made after some fixed amount of time elapses after the accessing of the object and/or location of the non-volatile memory. The skilled artisan will appreciate that many other implementations may be used, and the system may operate in a different fashion.

In step S411, the next command is received (e.g. an ambiguous command). In step S421, a determination is made if a predetermined object and/or location in non-volatile memory has been previously accessed. If so, a logical protocol transition is effected S431. If not, then in step S441, the command is interpreted according to the "current" logical protocol mode—i.e. either after effecting a transition or remaining in the same logical protocol mode as was used when interpreting an immediate predecessor.

In the example of FIG. 9B, a certain "extent of device usage" is required (see the "second question" of step S451) after the detection of the object and/or location of the non-volatile memory, thereby introducing a "delay" in making the logical protocol transition as compared to the flow or operation shown in FIG. 9A. This "delay" may be, for example, a certain number of commands that "need" to be executed after the accessing of the object and/or location. In another example, the transition is carried out 30 seconds after the detecting of accessing in non-volatile memory.

In step S411, the next command is received (e.g. an ambiguous command). In step S451, a determination is made if (i) a pre-determined object and/or location in non-volatile memory has been previously accessed S421 AND (ii) if an amount of subsequent device usage has exceeded a minimum usage (for example, an additional N>=1 commands must be subsequently received and/or interpreted, an additional amount of time needs to elapsed, etc. If the answer to both of these "questions" is yes, a logical protocol transition is effected S431.

In step S441, the command is interpreted according to the "current" logical protocol mode—i.e. either after effecting a transition or remaining in the same logical protocol mode as was used when interpreting an immediate predecessor.

Use Case VII: A Discussion of FIG. 10

FIG. 10 describes yet another use case which involves three protocols and seven events. In the non-limiting example of FIG. 10, several techniques explained earlier are combined with each other. FIG. 10 shows a state machine of a destination device 30 (e.g. a peripheral of the host) that receives commands from a source device and switches between the SATA 80, MTP 84, and HTTP 86 logical protocols based on system events only. In the current example, the syntaxes of SATA, MTP and HTTP protocols include neither an identifier operand nor an announcement command, which could notify the destination device when to switch from one logical protocol to another. However, the system is not limited to this arrangement, and the syntaxes could include either an identifier operand and/or an announcement command.

In the interest of simplicity, this example assumes that the destination device stores an operating system image file (loaded upon power up) that is accessed only by SATA protocol commands for reading. It is also assumed that the destination device stores other files, such as e-mails and MS Office applications in a logical partition accessed by MTP protocol only.

For the example to be informative and extensive, it is assumed that SATA is a block device protocol and MTP and HTTP are Object Oriented Storage protocols. It is further assumed that other files such as multimedia files (pictures, movies, songs) are stored in a dedicated partition that can be accessed only by HTTP protocol.

Based on the above assumptions, which are typical of many computing systems, the following rules can be applied to safely navigate between the three protocols.

The system illustrated in FIG. 10 may employ one or both of two protocol-switching policies:

1) A deterministic policy where, based on a deterministic set of rules, the destination device recognizes the identity of the protocol of the arriving command, for example, switching from MTP to SATA or from HTTP to SATA following a power up or a "warm reset" operation, or in accordance with a device policy, or in accordance with command parameters, or any combination thereof.

2) A non-deterministic policy for use where the rules and the circumstances indicate more than one possible protocol for a given command. In such cases, the system has rules for determining the priority of the candidate protocols, and selects the protocol to be used for interpretation according to this priority. The priority can be arbitrary, but can also be adjusted to the cost of error in case the protocol is misinterpreted. For example, a command can be valid in both HTTP and MTP. MTP deals with a user's personal files such as emails and contacts, whereas HTTP deals with commercial and redundant information, such as search data and textual publications. In case of an ambiguous command, it is preferable to interpret the ambiguous command as an HTTP command to minimize the potential damage to data that could occur as a result of incorrect interpretation. If the ambiguous command was really an MTP command and execution of this MTP command was missed due to "incorrect disambiguation," the penalty may be a slight delay in performance (due to retry), but not damage to data. Therefore, if a command arrives at a destination and can be interpreted both as HTTP and as MTP, the destination device will interpret it as HTTP.

In this use case, an "event" occurs when a command received by the destination device matches one or more of the following exemplary conditions:

a. The first command after power up.
   b. The first command after resume (from suspend).
   c. The previous command was interpreted in SATA and its meaning was to read the last OS image sector.
   d. The current command is not a valid SATA command.
   e. The current command is valid but violates a security policy. For example, the current command may be valid as a write command in SATA but not have been preceded by an obligatory security handshake in SATA. In this case, it may be decided that command is not likely to be a SATA command. Thus, in this case, a protocol other than SATA in which to interpret the current command may be selected. If the "current command" is found to be valid as an MTP command, the current command will be bandied as one. However, if no other protocol will "accept" this command and the current command is valid only as a SATA command, the current command will be handled as a SATA command that violates the security policy of the system.)
   f. The current command is not a logically valid HTTP command. The command meets HTTP syntax but does not access an HTTP partition.
   g. The current command is a logically valid MTP command. The command meets MTP syntax and accesses an MTP partition (a partition that is accessed only by MTP protocol).
   h. A logical "OR" combination of "b", "c", "d" and "e" is valid.
   i. The current command is a logically valid HTTP command. It meets HTTP syntax and accesses an HTTP partition (a partition that is accessed only by HTTP protocol).

The following events, as illustrated in FIG. 10, are now defined, based on the above conditions and received commands:

Event 0: Condition "a" is valid.
   Event 1: A logical "AND" combination of "f", "g" and "h" is valid.
   Event 2: Condition "a" is valid.
   Event 3: A logical "AND" combination of "f" and "g" is valid.
   Event 4: Condition "i" is valid.
   Event 5: A logical "AND" combination of "h" and "i" is valid.
   Event 6: Condition "a" is valid.

As shown in FIG. 10, the state machine moves from one state to another according to the above events, switching between the three protocols without an identifier and without an announcement by the destination device.

The techniques disclosed in FIG. 10 enable a system that was originally designed to work with the SATA and MTP protocols to work with an additional introduced protocol, HTTP, without requiring any change in the destination system—e.g. without requiring the destination system to use command prefixes or announcement commands.

It is appreciated that Use Case VII, and every use case disclosed herein, are merely provided as illustrative examples, and are not intended as limiting in any manner. Thus, the skilled artisan will appreciate that many other alternate implementations are possible.

Figure 11A:
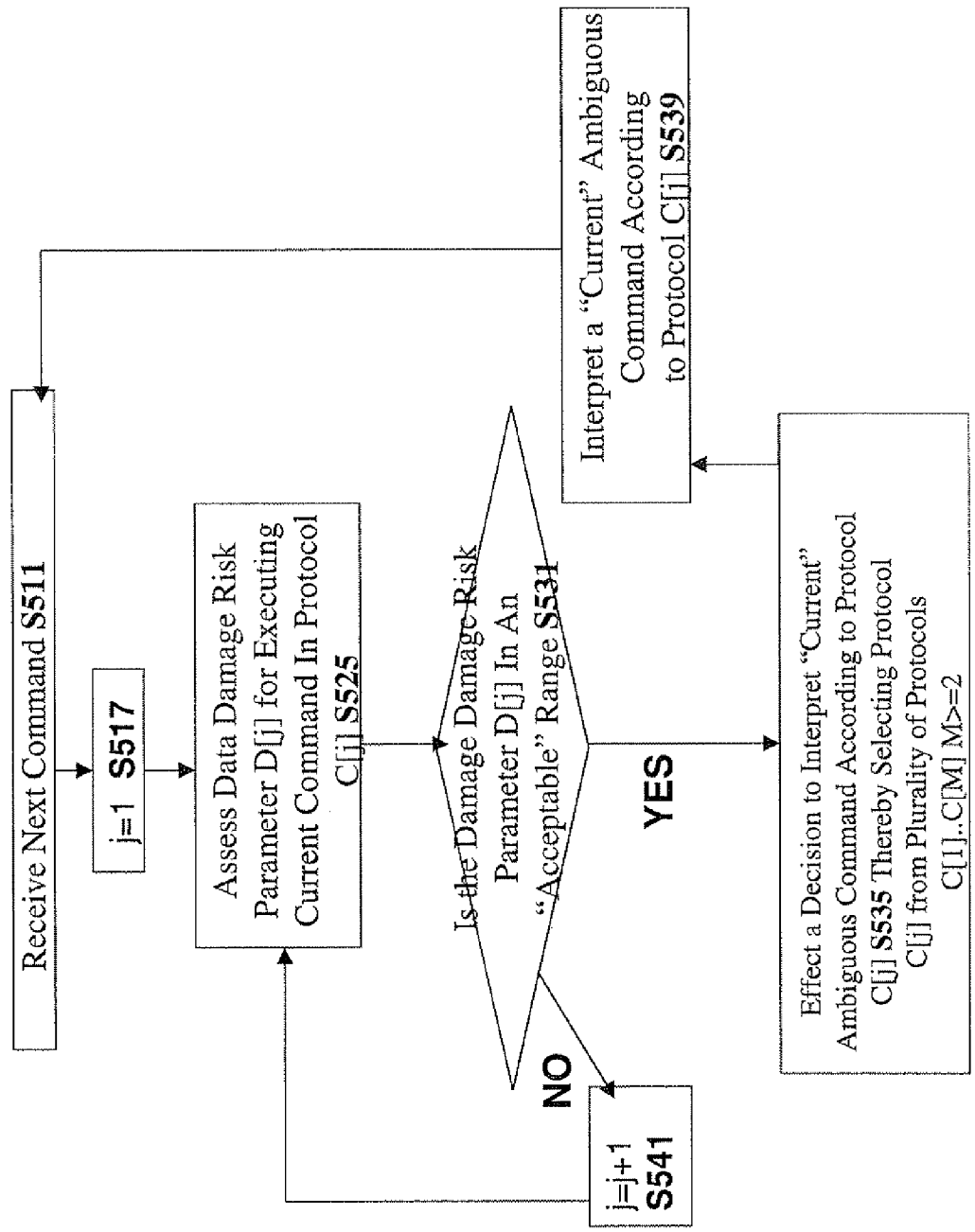
Figure 11B:
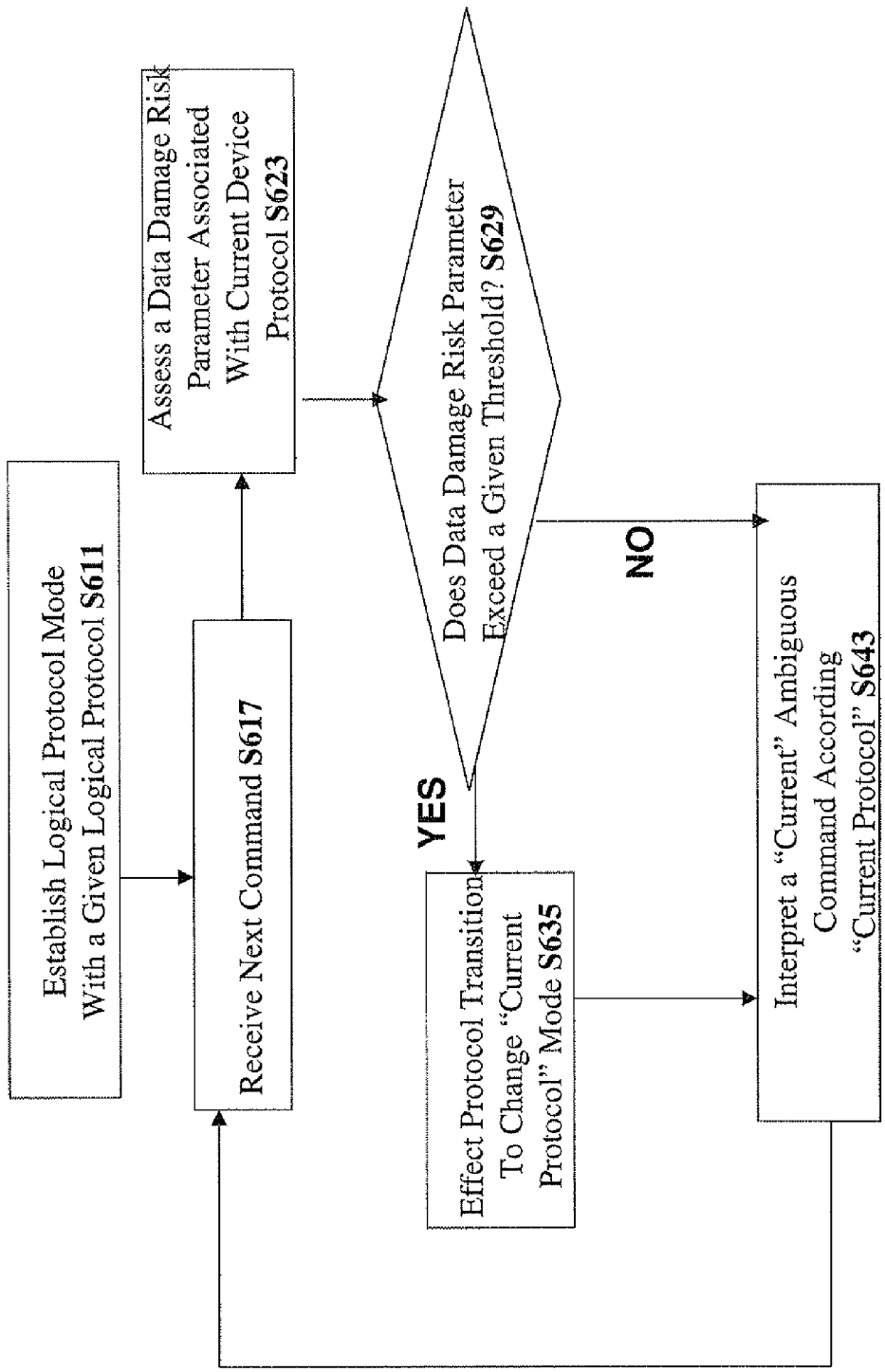

A Discussion of the Techniques of FIG. 11A-11B

In the previous section, a use case was presented where a command was interpreted as an HTTP command rather than an MTP command, in order to minimize the possibilities of damage occurring to data (for example, data residing on non-volatile memory of the destination device (e.g. personal files such as emails and contacts).

Thus, it is noted that the present inventor is now disclosing a technique for command disambiguation in accordance with a likelihood and/or potential extent of data damage, which are examples of "data damage indications." It is appreciated that the technique could also be applied or adapted to other types of data damage indications, including but not limited to an indication of potential damage to a specific type(s) of data object(s) and/or potential damage to data object(s) in one or more location(s).

Referring now to FIG. 1A, upon receiving of a command at step S511, the respective data damage risk D[j] (for example, any combination of a data damage likelihood and an "importance" of the data that may be damaged) is assessed for each candidate logical protocol C[j] (i.e. the risk associated with interpreting the "current" command according to the candidate logical protocol is assessed) according to step S517 and the loop defined in steps S525, S531, S541. In the event that a damage likelihood associated with a particular logical protocol is "acceptable," a decision is effected S535 to interpret S539 the current command according to the acceptable candidate logical protocol.

In the related example of FIG. 11B, the technique of protocol selection according to data damage risk is illustrated in steps S611, S617, S623, S629, S635, and S643 in terms of "protocol transitions." Thus, in step S611, a logical protocol mode is established with a given logical protocol, in step S617 the next command is received, and in step S623 a data damage risk parameter associated with a current device protocol is assessed. In step S629, it is assessed whether or not the data damage risk (i.e. a parameter indicative thereof) exceeds a given threshold. In the event that the risk does exceed the threshold, a protocol transition is effected S635 to change protocol mode. Otherwise, there is no required transition, and it is possible to remain in a previous protocol mode.

In step S643, a current ambiguous command is interpreted according to the current protocol (i.e. either after the transition or after a decision is made to remain in the same protocol mode as was used for an immediate predecessor).

CONCLUSION

It is further noted that any of the embodiments described above may further include receiving, sending or storing instructions and/or data that implement the operations described above in conjunction with the figures upon a computer readable medium. Generally speaking, a computer readable medium may include storage media or memory media such as magnetic or flash or optical media, e.g. disk or CD-ROM, volatile or non-volatile media such as RAM, ROM, etc. as well as transmission media or signals such as electrical, electromagnetic or digital signals conveyed via a communication medium such as network and/or wireless links.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A method of performing command disambiguation for a system including a first device and a second device which is in communication with the first device in order to receive commands from the first device, the method comprising:
   a) receiving, by the second device from the first device, a plurality of commands including an ambiguous command that is syntactically valid in a plurality of different logical protocols; and
   b) based on an extent of device usage since a most recent device reset event, effecting a logical protocol transition to associate said ambiguous command with a logical protocol that is different from a logical protocol used to interpret an immediate predecessor command received by the second device after said most recent device reset event.

2. The method of claim 1 wherein said ambiguous command is received via a point-to-point physical connection connecting the first device to the second device.

3. The method of claim 1 further comprising:
   c) interpreting, by the second device, said received ambiguous command using said logical protocol to which the second device transitioned.

4. The method of claim 1 wherein said effecting of said logical protocol transition is based on said extent of device usage exceeding a pre-determined threshold.

5. The method of claim 1 wherein said effecting of said logical protocol transition is based on at least one of:
   i) a number of commands previously received by the second device from the first device since said most recent device reset event;
   ii) a number of commands previously executed by the second device since said most recent device reset event;
   iii) a time elapsed since said most recent device reset event; and
   iv) a total amount of data received from the first device by the second device since said most recent device reset event.

6. The method of claim 1 wherein said most recent device reset event is one of:
   i) a most recent device powering-up; and
   ii) a most recent device resume-from-suspend.

7. The method of claim 1 wherein said most recent device reset event is one of:
   i) a most recent reset event of the first device, which sends the commands; and
   ii) a most recent reset event of the second device, which receives the commands.

8. The method of claim 1 wherein said logical protocol transition is a transition away from a device boot or wake-up protocol.

9. The method of claim 1 wherein said plurality of protocols includes at least two of:
   i) an object oriented storage protocol;
   ii) a block device protocol;
   iii) an Internet Protocol (IP) based protocol;
   iv) a Simple Object Access Protocol (SOAP);
   v) an Extensible Markup Language (XML) protocol;
   vi) a Hypertext Transfer Protocol (HTTP);
   vii) a File Transfer Protocol (FTP);
   viii) an Internet protocol; and
   ix) a device boot protocol.

10. A method of performing command disambiguation for a system including a first device and a second device which is in communication with the first device in order to receive commands from the first device, the method comprising:

a) receiving, by the second device from the first device, a plurality of commands including an ambiguous command that is syntactically valid in a plurality of different logical protocols; and
b) in accordance with an extent of device usage since a most recent device reset event, selecting, for said ambiguous command and from said plurality of logical protocols, a logical protocol as a target protocol in which to interpret said ambiguous command, wherein said selected target logical protocol is different from an initial protocol used to interpret a first command received after said most recent device reset event.

11. The method of claim 10 wherein said ambiguous command is received via a point-to-point physical connection connecting the first device to the second device.

12. The method of claim 10 wherein said plurality of logical protocols includes at least two of:
i) an object oriented storage protocol;
ii) a block device protocol;
iii) an Internet Protocol (IP) based protocol;
iv) a Simple Object Access Protocol (SOAP);
v) an Extensible Markup Language (XML) protocol;
vi) a Hypertext Transfer Protocol (HTTP);
vii) a File Transfer Protocol (FTP);
viii) an Internet protocol; and
ix) a device boot protocol.

13. The method of claim 10 further comprising:
c) interpreting, by the second device, said received ambiguous command using said selected target logical protocol.

14. The method of claim 10 wherein said selecting is based on said extent of device usage exceeding a pre-determined threshold.

15. The method of claim 10 wherein said selecting is based on at least one of:
i) a usage extent of the first device, which sends the commands; and
ii) a usage extent of the second device, which receives the commands from the first device.

16. The method of claim 10 wherein said selecting is based on at least one of:
i) a number of commands previously received by the second device from the first device since said most recent device reset event;
ii) a number of commands previously executed by the second device since said most recent device reset event;
iii) a time elapsed since said most recent device reset event; and
iv) a total amount of data received from the first device by the second device since said most recent device reset event.

17. The method of claim 10 wherein said most recent device reset event is one of:
i) a most recent device powering-up; and
ii) a most recent device resume-from-suspend.

18. The method of claim 10 wherein said most recent device reset event is one of:
i) a most recent reset event of the first device, which sends the commands; and
ii) a most recent reset event of the second device, which receives the commands.

19. A peripheral device comprising:
a) an inter-device interface for coupling with a host device; and
b) a logical protocol selector operative to:
i) receive, from said host device via said inter-device interface, a plurality of commands including an ambiguous command that is syntactically valid in a plurality of different logical protocols; and
ii) based on an extent of device usage since a most recent device reset event, effect a logical protocol transition to associate said ambiguous command with a logical protocol that is different from a logical protocol used to interpret an immediate predecessor command received via said inter-device interface after said device reset event.

20. The peripheral device of claim 19 further comprising:
c) a command interpreter operative to interpret said received ambiguous command using said logical protocol to which the transition is affected.

21. The peripheral device of claim 19 wherein said logical protocol selector is operative such that said effecting of said logical protocol transition is based on said extent of device usage exceeding a predetermined threshold.

22. The peripheral device of claim 19 wherein said logical protocol selector is operative such that said effecting of said logical protocol transition is based on at least one of:
i) a usage extent of said host device, which sends the commands; and
ii) a usage extent of the peripheral device, which receives the commands from said host device.

23. The peripheral device of claim 19 wherein said logical protocol selector is operative such that said effecting of said logical protocol transition is based on at least one of:
i) a number of commands previously received by the peripheral device from the first device since said most recent device reset event;
ii) a number of commands previously executed by the peripheral device since said most recent device reset event;
iii) a time elapsed since said most recent device reset event; and
iv) a total amount of data received from said host device by the peripheral device since said most recent device reset event.

24. The peripheral device of claim 19 wherein said logical protocol selector is operative such that said most recent device reset event is one of:
i) a most recent device powering-up; and
ii) a most recent device resume-from-suspend.

25. The peripheral device of claim 19 wherein said logical protocol selector is operative such that said most recent device reset event is one of:
i) a most recent reset event of said host device received via the inter-device interface; and
ii) a most recent reset event of the peripheral device.

26. The peripheral device of claim 19 wherein said logical protocol selector is operative such that said logical protocol transition is a transition away from a device boot or wake-up protocol.

27. A peripheral device comprising:
a) an inter-device interface for coupling with a host device; and
b) a logical protocol selector operative to:
i) receive, from said host device via said inter-device interface, a plurality of commands including an ambiguous command that is syntactically valid in a plurality of different logical protocols; and
ii) in accordance with an extent of device usage since a most recent device reset event, select, for said ambiguous command and from said plurality of logical protocols, a logical protocol as a target protocol in which to interpret said ambiguous command, wherein said selected target logical protocol is different from an initial protocol used to interpret a first command received via said inter-device interface after said most recent device reset event.

28. The peripheral device of claim 27 further comprising:
   c) a command interpreter operative to interpret said received ambiguous command using said selected target logical protocol.

29. The peripheral device of claim 27 wherein said logical protocol selector is operative such that said selecting of said target protocol is based on said extent of device usage exceeding a pre-determined threshold.

30. The peripheral device of claim 27 wherein said logical protocol selector is operative such that said selecting of said target protocol is based on at least one of:
   i) a usage extent of said host device, which sends the commands; and
   ii) a usage extent of the peripheral device, which receives the commands from the first device.

31. The peripheral device of claim 27 wherein said logical protocol selector is operative such that said selecting of said target protocol is based on at least one of:
   i) a number of commands previously received by the peripheral device from said host device since said most recent device reset event;
   ii) a number of commands previously executed by the peripheral device since said most recent device reset event;
   iii) a time elapsed since said most recent device reset event; and
   iv) a total amount of data received from said host device by the peripheral device since said most recent device reset event.

32. The peripheral device of claim 27 wherein said logical protocol selector is operative such that said most recent device reset event is one of:
   i) a most recent device powering-up; and
   ii) a most recent device resume-from-suspend.

33. The peripheral device of claim 27 wherein said logical protocol selector is operative such that said most recent device reset event is one of:
   i) a most recent reset event of said host device, which sends the commands; and
   ii) a most recent reset event of the peripheral device, which receives the commands.

34. A computer readable medium comprising storage media having stored thereon computer readable program code for performing command disambiguation for a system including a first device and a second device which is in communication with the first device in order to receive commands from the first device, the program code being operable to:
   a) handle a plurality of commands including an ambiguous command that is syntactically valid in a plurality of different logical protocols; and
   b) based on an extent of device usage since a most recent device reset event, effect a logical protocol transition to associate said ambiguous command with a logical protocol that is different from a logical protocol used to interpret an immediate predecessor command received by the second device after said device reset event.

35. The computer readable medium of claim 34 wherein the program code is operable to:
   c) interpret said received ambiguous command using said associated logical protocol.

36. The computer readable medium of claim 34 wherein the program code is operable such that said logical protocol transition is a transition away from a device boot or wake-up protocol.

37. The computer readable medium of claim 34 wherein said program code is operable such that said effecting of said logical protocol transition is based on said extent of device usage exceeding a pre-determined threshold.

38. The computer readable medium of claim 34 wherein said program code is operable such that said effecting of said logical protocol transition is based on at least one of:
   i) a usage extent of the first device, which sends the commands; and
   ii) a usage extent of the second device, which receives the commands from the first device.

39. The computer readable medium of claim 34 wherein said program code is operable such that said effecting of said logical protocol transition is based on at least one of:
   i) a number of commands previously received by the second device from the first device since said most recent device reset event;
   ii) a number of commands previously executed by the second device since said most recent device reset event;
   iii) a time elapsed since said most recent device reset event; and
   iv) a total amount of data received from the first device by the second device since said most recent device reset event.

40. The computer readable medium of claim 34 wherein said program code is operable such that said most recent device reset event is one of:
   i) a most recent device powering-up; and
   ii) a most recent device resume-from-suspend.

41. The computer readable medium of claim 34 wherein said program code is operable such that said most recent device reset event one of:
   i) a most recent reset event of the first device, which sends the commands; and
   ii) a most recent reset event of the second device, which receives the commands.

42. A method of performing command disambiguation, the method comprising:
   at a first device:
      receiving a plurality of commands including an ambiguous command that is syntactically valid in a plurality of different logical protocols; and
      based on results of an operation with respect to an evaluation of a policy of the first device, effecting a logical protocol transition to associate the ambiguous command with a logical protocol that is different from a logical protocol used to interpret an immediate predecessor command received by the first device from a second device.

43. The method of claim 42, wherein the policy includes an extent of device usage since a most recent device reset event.

44. The method of claim 43, further comprising, in accordance with the extent of device usage since a most recent device reset event, selecting for the ambiguous command and from the plurality of logical protocols, a logical protocol as a target protocol in which to interpret the ambiguous command, wherein the selected target logical protocol is different from an initial protocol used to interpret a first command received after the most recent device reset event.

45. The method of claim 42, wherein the operation includes at least one of:
   a number of commands previously received by the first device from the second device since a most recent device reset event;
   a number of commands previously executed by the first device since the most recent device reset event;
   a time elapsed since the most recent device reset event; and a total amount of data received by the first device from the second device since the most recent device reset event.

46. The method of claim 43, wherein the plurality of protocols includes at least two of:
an object oriented storage protocol;
a block device protocol;
an Internet Protocol (IP) based protocol;
a Simple Object Access Protocol (SOAP);
an Extensible Markup Language (XML) protocol;
a Hypertext Transfer Protocol (HTTP);
a File Transfer Protocol (FTP);
an Internet protocol; and
a device boot protocol.

47. The method of claim 43, wherein the second device is a host device.

48. The method of claim 42, wherein:
receiving comprises receiving, by the first device from the second device, the plurality of commands including the ambiguous command that is syntactically valid in a plurality of different logical protocols;
the operation with respect to the evaluation of the policy of the first device comprises determining whether or not to effect the logical protocol transition in accordance with at least one target parameter of said ambiguous command; and
effecting the logical protocol transition comprises:
if said determination is a positive determination, interpreting said ambiguous command using the at least one said target parameter of said ambiguous command in a target logical protocol that is different from a logical protocol used to interpret an immediate predecessor of said ambiguous command; and
otherwise, interpreting said ambiguous command in said logical protocol used to interpret said immediate predecessor of said ambiguous command.

49. The method of claim 48, wherein said ambiguous command is received via a point-to-point physical connection connecting the first device to the second device.

50. The method of claim 48, wherein said logical protocol transition is a transition away from a device boot or wake-up protocol.

51. The method of claim 48, wherein said determining is carried out in accordance with a data access policy.

52. The method of claim 48, wherein said determining is carried out in accordance with a security policy.

53. The method of claim 48, wherein the at least one said target parameter is one of:
a sector identifier;
a partition identifier;
a block identifier;
a file identifier;
a directory identifier; and
data object identifier.

54. The method of claim 42, wherein said plurality of protocols includes at least two of:
an object oriented storage protocol;
a block device protocol;
an Internet Protocol (IP) based protocol;
a Simple Object Access Protocol (SOAP);
an Extensible Markup Language (XML) protocol;
a Hypertext Transfer Protocol (HTTP);
a File Transfer Protocol (FTP);
an Internet protocol; and
a device boot protocol.

55. The method of claim 48, wherein:
receiving comprises receiving, by the first device from the second device, an ordered sequence of commands including the ambiguous command that is syntactically valid in a plurality of different logical protocols;
the operation with respect to the evaluation of the policy of the first device is based on one or more target parameters of the ambiguous command; and
effecting the logical protocol transition comprises:
interpreting N consecutive commands using said associated target logical protocol, wherein:
a first command of said N consecutive commands is the ambiguous command; and
N is a positive integer whose value does not depend on said one or more target parameters of said ambiguous command.

56. The method of claim 55, wherein said ambiguous command is received via a point-to-point physical connection connecting the first device to the second device.

57. The method of claim 55, wherein said logical protocol transition is a transition away from a device boot or wake-up protocol.

58. The method of claim 55, further comprising interpreting, by the second device, said received ambiguous command using said associated logical protocol.

59. The method of claim 55, wherein said plurality of protocols includes at least two of:
an object oriented storage protocol;
a block device protocol;
an Internet Protocol (IP) based protocol;
a Simple Object Access Protocol (SOAP);
an Extensible Markup Language (XML) protocol;
a Hypertext Transfer Protocol (HTTP);
a File Transfer Protocol (FTP);
an Internet protocol; and
a device boot protocol.

60. The method of claim 55, wherein said effecting of said logical protocol transition is carried out in accordance with a data access policy.

61. The method of claim 55, wherein said effecting of said logical protocol transition is carried out in accordance with a security policy.

62. The method of claim 55, wherein the at least one said target parameter is one of:
a sector identifier;
a partition identifier;
a block identifier;
a file identifier;
a directory identifier; and
data object identifier.

63. The method of claim 42, wherein:
receiving comprises receiving, by the first device from the second device, an ordered sequence of commands including the ambiguous command that is syntactically valid in a plurality of different logical protocols;
the operation with respect to the evaluation of the policy of the first device is based on one or more target parameters of said ambiguous command; and
effecting the logical protocol transition comprises:
interpreting N consecutive commands using said associated target logical protocol, wherein:
N is a positive integer;
a first command of the N consecutive commands is said ambiguous command; and
no commitment is made to interpret a subsequent command, which is received after the N consecutive commands, using said predecessor logical protocol.

64. The method of claim 63, wherein said ambiguous command is received via a point-to-point physical connection connecting the first device to the second device.

65. The method of claim 63, further comprising interpreting, by the first device, the received ambiguous command using said associated logical protocol.

66. The method of claim 63, wherein said logical protocol transition is a transition away from a device boot or wake-up protocol.

67. The method of claim 63, wherein said target-parameter-based logical protocol transition is carried out in accordance with a data access policy.

68. The method of claim 63, wherein said target-parameter-based logical protocol transition is carried out in accordance with a security policy.

69. The method of claim 63, wherein at least one said target parameter is one of:
a sector identifier;
a partition identifier;
a block identifier;
a file identifier;
a directory identifier; and
data object identifier.

70. The method of claim 63, wherein said plurality of protocols includes at least two of:
an object oriented storage protocol;
a block device protocol;
an Internet Protocol (IP) based protocol;
a Simple Object Access Protocol (SOAP);
an Extensible Markup Language (XML) protocol;
a Hypertext Transfer Protocol (HTTP);
a File Transfer Protocol (FTP);
an Internet protocol; and
a device boot protocol.

71. The method of claim 42, wherein:
receiving comprises receiving, by the first device from the second device, the plurality of commands including the ambiguous command that is syntactically valid in a plurality of different logical protocols;
the operation with respect to the evaluation of the policy of the first device is in accordance with a combination of:
one or more target parameters of one or more commands received before said ambiguous command; and
one or more target parameters of said ambiguous command, and
effecting the logical protocol transition comprises selecting for said ambiguous command a logical protocol from said plurality of logical protocols as a target protocol in which to interpret said ambiguous command.

72. The method of claim 71, wherein said ambiguous command is received via a point-to-point physical connection connecting the first device to the second device.

73. The method of claim 71, further comprising interpreting, by the first device, said received ambiguous command using said selected target logical protocol.

74. The method of claim 71, wherein said plurality of protocols includes at least two of:
an object oriented storage protocol;
a block device protocol;
an Internet Protocol (IP) based protocol;
a Simple Object Access Protocol (SOAP);
an Extensible Markup Language (XML) protocol;
a Hypertext Transfer Protocol (HTTP);
a File Transfer Protocol (FTP);
an Internet protocol; and
a device boot protocol.

75. The method of claim 71, wherein said target-parameter-dependent selecting of said target logical protocol is carried out in accordance with a data access policy.

76. The method of claim 71, wherein said target-parameter-dependent selecting of said target logical protocol is carried out in accordance with a security policy.

77. The method of claim 71, wherein at least one said target parameter is one of:
a sector identifier;
a partition identifier;
a block identifier;
a file identifier;
a directory identifier; and
data object identifier.

78. The method of claim 42, wherein:
receiving comprises receiving, by the first device from the second device, the plurality of commands including the ambiguous command that is syntactically valid in a plurality of different logical protocols;
the operation with respect to the evaluation of the policy of the first device comprises being responsive to an accessing of at least one of:
a pre-defined location in non-volatile memory of the first device which receives the commands; and
a pre-defined object stored in said non-volatile memory of the first device which receives the commands; and
effecting the logical protocol transition comprises selecting for said ambiguous command a logical protocol from said plurality of logical protocols as a target protocol in which to interpret said ambiguous command.

79. The method of claim 42, wherein said ambiguous command is received via a point-to-point physical connection connecting the first device to the second device.

80. The method of claim 78, wherein said accessing is a read-accessing.

81. The method of claim 78, wherein said pre-defined location is a location of a last sector of an operating system (OS) image.

82. The method of claim 78, wherein said pre-defined object is an OS image.

83. The method of claim 78, wherein said plurality of protocols includes at least two of:
an object oriented storage protocol;
a block device protocol;
an Internet Protocol (IP) based protocol;
a Simple Object Access Protocol (SOAP);
an Extensible Markup Language (XML) protocol;
a Hypertext Transfer Protocol (HTTP);
a File Transfer Protocol (FTP);
an Internet protocol; and
a device boot protocol.

84. The method of claim 42, wherein:
receiving comprises receiving, by the first device from the second device, the plurality of commands including the ambiguous command that is syntactically valid in a plurality of different logical protocols;
the operation with respect to the evaluation of the policy of the first device is in accordance with a logical-protocol-dependent indication that said ambiguous command violates a device policy, wherein the device policy is one of:
a security policy; and
a data access policy; and
effecting the logical protocol transition comprises selecting for said ambiguous command a logical protocol from said plurality of logical protocols as a target protocol in which to interpret said ambiguous command.

85. The method of claim 84, wherein said ambiguous command is received via a point-to-point physical connection connecting the first device to the second device.

86. The method of claim 84, further comprising interpreting, by the first device, the received ambiguous command using the selected target logical protocol.

87. The method of claim 84, wherein the plurality of protocols includes at least two of:
an object oriented storage protocol;
a block device protocol;
an Internet Protocol (IP) based protocol;
a Simple Object Access Protocol (SOAP);
an Extensible Markup Language (XML) protocol;
a Hypertext Transfer Protocol (HTTP);
a File Transfer Protocol (FTP);
an Internet protocol; and
a device boot protocol.

88. The method of claim 42, wherein:
receiving comprises receiving, by the first device from the second device, the plurality of commands including the ambiguous command that is syntactically valid in a plurality of different logical protocols;
the operation with respect to the evaluation of the policy of the first device is in accordance with an indication of a data damage risk associated with executing of said ambiguous command in a candidate protocol selected from said plurality of logical protocols; and
effecting the logical protocol transition comprises selecting for said ambiguous command a logical protocol from said plurality of logical protocols as a target protocol in which to interpret said ambiguous command.

89. The method of claim 88, wherein said ambiguous command is received via a point-to-point physical connection connecting the first device to the second device.

90. The method of claim 88, further comprising interpreting, by the first device, said received ambiguous command using said selected target logical protocol.

91. The method of claim 88, wherein said plurality of protocols includes at least two of:
an object oriented storage protocol;
a block device protocol;
an Internet Protocol (IP) based protocol;
a Simple Object Access Protocol (SOAP);
an Extensible Markup Language (XML) protocol;
a Hypertext Transfer Protocol (HTTP);
a File Transfer Protocol (FTP);
an Internet protocol; and
a device boot protocol.

92. A peripheral device comprising:
an inter-device interface operative to couple the peripheral device with a host device; and
a logical protocol selector operative to:
receive a plurality of commands including an ambiguous command that is syntactically valid in a plurality of different logical protocols; and
based on results of an operation with respect to an evaluation of a policy of the peripheral device, effect a logical protocol transition to associate the ambiguous command with a logical protocol that is different from a logical protocol used to interpret an immediate predecessor command received by the peripheral device from the host device.

93. The peripheral device of claim 92, wherein:
receiving comprises receiving, from said host device via said inter-device interface, the plurality of commands including the ambiguous command that is syntactically valid in a plurality of different logical protocols;
the operation with respect to the evaluation of the policy of the peripheral device comprises determining whether or not to effect the logical protocol transition in accordance with at least one target parameter of said ambiguous command; and
wherein the peripheral device further comprises a command interpreter operative to effect the logical protocol transition, the command interpreter operative:
if said determination is a positive determination, to interpret said ambiguous command using at least one said target parameter of said ambiguous command in a target logical protocol that is different from a logical protocol used to interpret an immediate predecessor of said ambiguous command; and
otherwise to interpret said ambiguous command in said logical protocol used to interpret said immediate predecessor.

94. The peripheral device of claim 93, wherein said logical protocol selector is operative such that said determining is carried out in accordance with a data access policy.

95. The peripheral device of claim 93, wherein said logical protocol selector is operative such that said determining is carried out in accordance with a security policy.

96. The peripheral device of claim 93, wherein said logical protocol selector is operative such that said logical protocol transition is a transition away from a device boot or wake-up protocol.

97. The peripheral device of claim 92, wherein:
receiving comprises receiving, from said host device via said inter-device interface, the plurality of commands including the ambiguous command that is syntactically valid in a plurality of different logical protocols;
the operation with respect to the evaluation of the policy of the peripheral device is based on one or more target parameters of said ambiguous command; and
wherein the peripheral device further comprises a command interpreter operative to effect the logical protocol transition, the command interpreter operative to interpret N consecutive commands using said associated target logical protocol, wherein:
a first command of said N consecutive commands is said ambiguous command; and
N is a positive integer whose value does not depend on said one or more target parameters of said ambiguous command.

98. The peripheral device of claim 97, wherein said logical protocol selector is operative such that said logical protocol transition is a transition away from a device boot or wake-up protocol.

99. The peripheral device of claim 97, wherein said logical protocol selector is operative such that said effecting of said logical protocol transition is carried out in accordance with a data access policy.

100. The peripheral device of claim 97, wherein said logical protocol selector is operative such that said effecting of said logical protocol transition is carried out in accordance with a security policy.

101. The peripheral device of claim 97, wherein said logical protocol selector is to effect said logical protocol transition in accordance with a target parameter, wherein the target parameter is one of:
a sector identifier;
a partition identifier;
a block identifier;
a file identifier;
a directory identifier; and
data object identifier.

102. The peripheral device of claim 92, wherein:
receiving comprises receiving, from said host device via said inter-device interface, the plurality of commands including the ambiguous command that is syntactically valid in a plurality of different logical protocols;
the operation with respect to the evaluation of the policy of the peripheral device is based on one or more target parameters of said ambiguous command; and
wherein the peripheral device further comprises a command interpreter operative to effect the logical protocol transition, the command interpreter operative to interpret N consecutive commands using said associated target logical protocol, wherein:
N is a positive integer;
a first command of said N consecutive commands is said ambiguous command; and
no commitment is made to interpret a subsequent command, which is received after said N consecutive commands, using said predecessor logical protocol.

103. The peripheral device of claim 102 wherein said logical protocol selector is operative such that said logical protocol transition is a transition away from a device boot or wake-up protocol.

104. The peripheral device of claim 102 wherein said logical protocol selector is operative such that said effecting of said logical protocol transition is carried out in accordance with a data access policy.

105. The peripheral device of claim 102 wherein said logical protocol selector is operative such that said effecting of said logical protocol transition is carried out in accordance with a security policy.

106. The peripheral device of claim 102 wherein said logical protocol selector is to effect said logical protocol transition in accordance with one or more of:
a sector identifier;
a partition identifier;
a block identifier.
a file identifier;
a directory identifier; and
data object identifier.

107. The peripheral device of claim 92, wherein:
receiving comprises receiving, from said host device via said inter-device interface, the plurality of commands including the ambiguous command that is syntactically valid in a plurality of different logical protocols;
the operation with respect to the evaluation of the policy of the peripheral device is in accordance with a combination of:
one or more target parameters of one or more commands received before said ambiguous command; and
one or more target parameters of said ambiguous command; and
effecting the logical protocol transition comprises selecting for said ambiguous command a logical protocol from said plurality of logical protocols as a target protocol in which to interpret said ambiguous command.

108. The peripheral device of claim 107, further comprising a command interpreter operative to interpret said received ambiguous command using said selected target logical protocol.

109. The peripheral device of claim 107, wherein said logical protocol selector is operative such that said selecting of said target logical protocol is carried out in accordance with a data access policy.

110. The peripheral device of claim 107, wherein said logical protocol selector is operative such that said selecting of said target logical protocol is carried out in accordance with a security policy.

111. The peripheral device of claim 107 wherein said logical protocol selector is operative to effect selecting said target logical protocol in accordance with one or more of:
a sector identifier;
a partition identifier;
a block identifier;
a file identifier;
a directory identifier; and
data object identifier.

112. The peripheral device of claim 92, wherein:
receiving comprises receiving, from said host device via said inter-device interface, the plurality of commands including the ambiguous command that is syntactically valid in a plurality of different logical protocols;
the operation with respect to the evaluation of the policy of the peripheral device comprises accessing at least one of:
a pre-defined location in non-volatile memory of the peripheral device which receives the commands; and
a pre-defined object stored in said non-volatile memory of the peripheral device which receives the commands; and
effecting the logical protocol transition comprises selecting for said ambiguous command a logical protocol from said plurality of logical protocols as a target protocol in which to interpret said ambiguous command.

113. The peripheral device of claim 112, wherein said logical protocol selector is operative such that said accessing is a read-accessing.

114. The peripheral device of claim 112, wherein said logical protocol selector is operative such that said pre-defined location is a location of a last sector of an operating system (OS) image.

115. The peripheral device of claim 112, wherein said logical protocol selector is operative such that said pre-defined object is an OS image.

116. The peripheral device of claim 112, further comprising a command interpreter operative to interpret said received ambiguous command using said selected target logical protocol.

117. The peripheral device of claim 92, wherein:
receiving comprises receiving, from said host device via said inter-device interface, the plurality of commands including the ambiguous command that is syntactically valid in a plurality of different logical protocols;
the operation with respect to the evaluation of the policy of the peripheral device is in accordance with a logical-protocol-dependent indication that said ambiguous command violates at least one device policy from among:
a security policy; and
a data access policy; and
effecting the logical protocol transition comprises selecting for said ambiguous command a logical protocol from said plurality of logical protocols as a target protocol in which to interpret said ambiguous command.

118. The peripheral device of claim 117, further comprising a command interpreter operative to interpret said received ambiguous command using said selected target logical protocol.

119. The peripheral device of claim 92, wherein:
receiving comprises receiving, from said host device via said inter-device interface, the plurality of commands including the ambiguous command that is syntactically valid in a plurality of different logical protocols;

the operation with respect to the evaluation of the policy of the peripheral device is in accordance with an indication of a data damage risk associated with executing of said ambiguous command in a candidate protocol selected from said plurality of logical protocols; and effecting the logical protocol transition comprises selecting for said ambiguous command a logical protocol from said plurality of logical protocols as a target protocol in which to interpret said ambiguous command.

120. The peripheral device of claim 119, further comprising a command interpreter operative to interpret said received ambiguous command using said selected target logical protocol.

* * * * *

UNITED STATES PATENT AND TRADEMARK OFFICE
CERTIFICATE OF CORRECTION

PATENT NO. : 7,970,957 B2  
APPLICATION NO. : 11/960770  
DATED : June 28, 2011  
INVENTOR(S) : Amir Mosek Page 1 of 1

It is certified that error appears in the above-identified patent and that said Letters Patent is hereby corrected as shown below:

In the Claims

Column 40, Claim 41, Line 32, "device reset event one of:" should read --device reset event is one of:--.

Column 41, Claim 46, Line 3, "The method of claim 43, wherein the plurality of protocols" should read --The method of claim 42, wherein the plurality of protocols--.

Column 41, Claim 47, Line 14, "The method of claim 43, wherein the second device is a host" should read --The method of claim 42, wherein the second device is a host--.

Column 41, Claim 54, Line 54, "The method of claim 42, wherein said plurality of protocols" should read --The method of claim 48, wherein said plurality of protocols--.

Column 41, Claim 55, Line 65, "The method of claim 48, wherein:" should read --The method of claim 42, wherein:--.

Column 44, Claim 79, Line 31, "The method of claim 42, wherein said ambiguous command" should read --The method of claim 78, wherein said ambiguous command--.

Signed and Sealed this  
Twenty-second Day of July, 2014

Michelle K. Lee  
*Deputy Director of the United States Patent and Trademark Office*